United States Patent
Zhou et al.

(10) Patent No.: US 12,149,367 B2
(45) Date of Patent: Nov. 19, 2024

(54) FEEDBACK INFORMATION TRANSMISSION METHOD, TERMINAL, AND STORAGE MEDIUM

(71) Applicant: Beijing Unisoc Communications Technology Co., Ltd., Beijing (CN)

(72) Inventors: Huan Zhou, Beijing (CN); Sa Zhang, Beijing (CN); Hualei Wang, Beijing (CN)

(73) Assignee: Beijing Unisoc Communications Technology Co., Ltd., Beijing (CN)

( * ) Notice: Subject to any disclaimer, the term of this patent is extended or adjusted under 35 U.S.C. 154(b) by 359 days.

(21) Appl. No.: 17/576,524

(22) Filed: Jan. 14, 2022

(65) Prior Publication Data
US 2022/0140958 A1 May 5, 2022

Related U.S. Application Data

(63) Continuation of application No. PCT/CN2020/092100, filed on May 25, 2020.

(30) Foreign Application Priority Data

Jul. 16, 2019 (CN) .......................... 201910642562.9

(51) Int. Cl.
  *H04L 1/1867* (2023.01)
  *H04B 7/0456* (2017.01)
  (Continued)

(52) U.S. Cl.
  CPC ......... *H04L 1/1893* (2013.01); *H04B 7/0456* (2013.01); *H04L 1/1887* (2013.01);
  (Continued)

(58) Field of Classification Search
  CPC ... H04L 1/1893; H04L 1/1887; H04L 5/0055; H04L 2001/0092; H04L 1/1854;
  (Continued)

(56) References Cited

U.S. PATENT DOCUMENTS 10,785,753 B1 * 9/2020 Li .......................... H04L 5/0044
10,993,141 B2 * 4/2021 Huang .................. H04L 1/1812
(Continued)

FOREIGN PATENT DOCUMENTS

CN 107645774 A 1/2018
CN 108476390 A 8/2018
(Continued)

OTHER PUBLICATIONS

Huawei, HiSilicon, "Bandwidth Parts and Resource Pools for V2X sidelink," 3GPP TSG RAN WG1 Meeting #95, agenda item 7.2.4.1.5, document No. R1-1813555, Nov. 12-16, 2018, Spokane, WA, US.

(Continued)

*Primary Examiner* — Brian T O Connor
(74) *Attorney, Agent, or Firm* — Womble Bond Dickinson (US) LLP

(57) ABSTRACT

The present disclosure relates to the technical field of communications, particularly to a feedback information transmission method. The method comprises: sending, by a first terminal, a sidelink hybrid auto repeat request ACK (HARQ-ACK) codebook via a physical uplink channel within a target time unit for sending sidelink HARQ-ACK information within the target time unit, the sidelink HARQ-ACK codebook including sidelink HARQ-ACK information corresponding to at least one sidelink data.

20 Claims, 6 Drawing Sheets

(51) Int. Cl.
*H04L 5/00* (2006.01)
*H04W 4/40* (2018.01)
*H04W 72/20* (2023.01)

(52) U.S. Cl.
CPC ........... *H04L 5/0055* (2013.01); *H04W 72/20* (2023.01); *H04W 4/40* (2018.02)

(58) Field of Classification Search
CPC ... H04L 1/1861; H04L 1/1607; H04L 1/1812; H04L 1/1858; H04L 5/0053; H04L 1/1685; H04L 1/1896; H04L 5/0091; H04L 1/0027; H04B 7/0456; H04W 72/20; H04W 4/40; H04W 72/0446; H04W 72/23; H04W 72/1273
See application file for complete search history.

(56) References Cited

U.S. PATENT DOCUMENTS

| | | | | |
|---|---|---|---|---|
| 11,252,753 | B2* | 2/2022 | Chen | H04L 1/1887 |
| 11,444,729 | B2* | 9/2022 | Yeo | H04W 52/367 |
| 11,601,222 | B2* | 3/2023 | Lee | H04L 1/1671 |
| 11,617,195 | B2* | 3/2023 | Huang | H04L 5/0048 370/329 |
| 11,632,196 | B2* | 4/2023 | Saber | H04L 5/0055 370/329 |
| 11,778,616 | B2* | 10/2023 | Park | H04L 1/1864 370/329 |
| 2019/0116607 | A1 | 4/2019 | Lee et al. | |
| 2019/0149275 | A1 | 5/2019 | He et al. | |
| 2019/0149365 | A1 | 5/2019 | Chatterjee et al. | |
| 2019/0182807 | A1 | 6/2019 | Panteleev et al. | |
| 2020/0295882 | A1* | 9/2020 | Wang | H04L 1/1861 |
| 2021/0006318 | A1* | 1/2021 | Kim | H04L 1/1867 |
| 2021/0050953 | A1* | 2/2021 | Park | H04B 7/0456 |
| 2021/0136783 | A1* | 5/2021 | Fakoorian | H04W 76/14 |
| 2021/0336728 | A1* | 10/2021 | Selvanesan | H04L 1/1896 |
| 2022/0038242 | A1* | 2/2022 | Yoshioka | H04L 5/0055 |
| 2022/0053521 | A1* | 2/2022 | Yoshioka | H04L 1/1896 |
| 2023/0208561 | A1* | 6/2023 | Saber | H04L 1/1896 370/329 |

FOREIGN PATENT DOCUMENTS

| | | |
|---|---|---|
| CN | 108923894 A | 11/2018 |
| CN | 109076578 A | 12/2018 |
| CN | 109600212 A | 4/2019 |
| CN | 109792594 A | 5/2019 |
| CN | 109891981 A | 6/2019 |
| CN | 109963264 A | 7/2019 |
| CN | 110311762 A | 10/2019 |
| WO | 2019095202 A1 | 5/2019 |

OTHER PUBLICATIONS

Huawei, HiSilicon, "Sidelink physical layer procedures for NR V2X," 3GPP TSG RAN WG1 Meeting #95, agenda item 7.2.4.1.2, document No. R1-1812205, Nov. 12-16, 2018, Spokane, WA, US.

Vivo, "Discussion on mode 1 resource allocation mechanism," 3GPP TSG RAN WG1 #97, agenda item 7.2.4.2.1, document No. R1-1906138, May 13-17, 2019, Reno, NA, US.

Xiaomi Communications, "On Physical layer procedures for V2x communications," 3GPP TSG RAN WG1 Ad-Hoc Meeting 1901, agenda item 7.2.4.1.2, document No. R1-1901017, Jan. 21-25, 2019, Taipei.

3GPP, "3rd Generation Partnership Project; Technical Specification Group Radio Access Network; NR; Study on NR Vehicle-to-Everything (V2X)," 3GPP TR 38.885 V16.0.0, technical report, Mar. 2019, Valbonne, France.

3GPP TSG RAN WG1 Meeting #97, "On Mode 1 resource allocation in NR V2X", May 13-17, 2019, 4 pages, Reno, USA.

3GPP TSG RAN WG1 #96, "Discussion on HARQ feedback for NR V2X", Feb. 25-Mar. 1, 2019, 4 pages, Athens, Greece.

Huawei et al: "Bandwidth Parts and Resource Pools for V2X sidelink", 3GPP Draft; RI-1813555, 3rd Generation Partnership Project (3GPP), Nov. 3, 2018, Mobile Competence Centre; 650, Route Des Lucioles; F-06921 Sophia-Antipolis Cedex; France.

Fraunhofer HHI, Fraunhofer IIS, "Physical Layer Procedures for Unicast and Groupcast," 3GPP TSG RAN WG1 Meeting AH-1901, R1-1900355, Taipei, Taiwan, Jan. 21-25, 2018 (7 Pages).

* cited by examiner

In response to a need to send sidelink HARQ-ACK information within a target time unit, a first terminal sends a sidelink HARQ-ACK codebook via a physical layer uplink channel within the target time unit, the sidelink HARQ-ACK codebook including sidelink HARQ-ACK information corresponding to at least one sidelink data. — 801

FEEDBACK INFORMATION TRANSMISSION METHOD, TERMINAL, AND STORAGE MEDIUM

CROSS REFERENCE TO RELATED APPLICATIONS

This application is a continuation application of International Application No. PCT/CN2020/092100, filed on May 25, 2020, which claims priority of Chinese Application No. 201910642562.9, filed on Jul. 16, 2019, both of which are incorporated by reference herein.

TECHNICAL FIELD

The present disclosure relates to the technical field of communications, particularly to a feedback information transmission method and apparatus, a terminal, and a storage medium.

BACKGROUND

In the vehicle to everything (V2X) technology, an in-vehicle device and another device (e.g., another in-vehicle device or roadside infrastructure) can communicate with each other via a sidelink.

In the related art, the method of sidelink communication scheduled by an access network device comprises: sending, by an access network device, scheduling information to a sidelink communication transmitter user equipment (referred to as a first terminal) based on the downlink control information (DCI), and sending, by the first terminal, a sidelink resource to a sidelink communication receiver user equipment (referred to as a second terminal) via a sidelink based on the scheduling information of the access network device.

The new radio (NR) system supports two types of hybrid auto repeat request (HARD) feedback codebooks: one is Type 1 HARQ-ACK codebook, and the other is Type 2 HARQ-ACK codebook. Since Type 1 HARQ-ACK codebook is generated based on time domain resources of the Physical Downlink Shared Channel (PDSCH), the first terminal cannot associate a sidelink resource, when contained in the DCI, with the start and length indicator (SLIV) for the PDSCH. Therefore, when there is a need to feed back the Type 1 HARQ-ACK codebook, how to transmit the HARQ-ACK codebook is a problem that has not been solved.

SUMMARY

In view of the above, the present disclosure proposes a feedback information transmission method and apparatus, a terminal, and a storage medium. The technical solution is as follows:

According to one aspect of the present disclosure, there is provided a feedback information transmission method, comprising:

sending, by a first terminal, a sidelink hybrid auto repeat request ACK (HARQ-ACK) codebook via a physical uplink channel within a target time unit for sending sidelink HARQ-ACK information within the target time unit, the sidelink HARQ-ACK codebook including sidelink HARQ-ACK information corresponding to at least one sidelink data, wherein the sidelink HARQ-ACK information is configured to indicate a receiving state corresponding to the sidelink data, and the sidelink data is physical layer data sent by the first terminal via a sidelink.

According to another aspect of the present disclosure, there is provided a feedback information transmission apparatus, comprising:

a transmission module configured to send, by a first terminal, a sidelink hybrid auto repeat request ACK (HARQ-ACK) codebook via a physical uplink channel within a target time unit for sending sidelink HARQ-ACK information within the target time unit, wherein the sidelink HARQ-ACK codebook includes sidelink HARQ-ACK information corresponding to at least one sidelink data, wherein the sidelink HARQ-ACK information is configured to indicate a receiving state corresponding to the sidelink data, and the sidelink data is physical layer data sent by the first terminal via a sidelink.

According to another aspect of the present disclosure, there is provided a terminal, comprising:

a processor; and
a memory configured to store instructions executable by the processor,
wherein the processor is configured to:
send a sidelink hybrid auto repeat request ACK (HARQ-ACK) codebook via a physical uplink channel within a target time unit for sending sidelink HARQ-ACK information within the target time unit, the sidelink HARQ-ACK codebook including sidelink HARQ-ACK information corresponding to at least one piece of sidelink data, wherein the sidelink HARQ-ACK information is configured to indicate a receiving state corresponding to the sidelink data, and the sidelink data is physical layer data sent by the first terminal via a sidelink.

According to another aspect of the present disclosure, there is provided a non-transitory computer-readable storage medium having computer program instructions stored thereon, wherein the computer program instructions, when executed by a processor, implement the method described above.

Other features and aspects of the present disclosure will become clear from the following detailed description of exemplary embodiments with reference to the accompanying drawings.

BRIEF DESCRIPTION OF THE DRAWINGS

The drawings herein, which are incorporated in and constitute a part of the specification, together with the specification, illustrate exemplary embodiments, features, and aspects of the present disclosure, and serve to explain the principle of the present disclosure.

DETAILED DESCRIPTION

Figure 1:
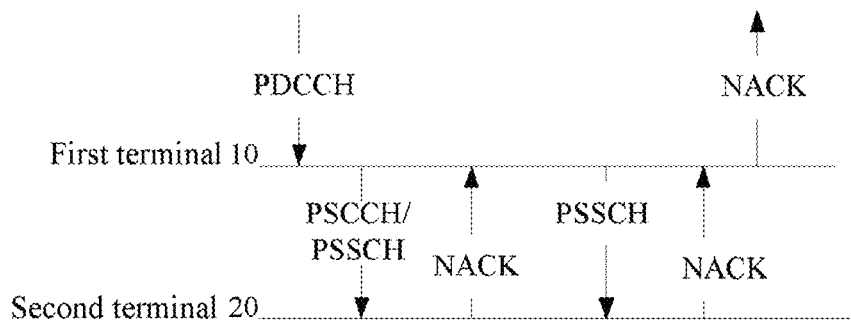
FIGS. 1 to 6 show schematic diagrams of the principles involved in the feedback information transmission method in the related art.

Various exemplary embodiments, features, and aspects of the present disclosure will be described in detail with reference the drawings. The same reference numerals in the drawings denote elements of equal or similar functions. Although various aspects of the embodiments are shown in the drawings, it is unnecessary to proportionally draw the drawings unless otherwise specified.

The term "exemplary" herein means "used as an example or embodiment or for an illustrative purpose". Any "exemplary" embodiments described herein are not necessarily interpreted as being superior to or better than other embodiments.

In order to better explain the present disclosure, a number of details are given in the following detailed description of embodiments. It should be appreciated by a person skilled in the art that without some of the details, the present disclosure can still be implemented. In some of the embodiments, methods, means, units and circuits that are well known to a person skilled in the art are not described in detail in order to highlight the principle of the present disclosure.

The 80th Plenary Session of the 3rd Generation Partnership Project (3GPP) has adopted the 5G new radio (NR) vehicle-to-everything (V2X) research project.

The NR air interface (Uu) has two types of control information: the downlink control information (DCI) and the uplink control information (UCI). NR V2X also defines two types of control information: the sidelink control information (SCI) and the sidelink feedback control information (SFCI). The SCI is configured to carry information necessary for PSSCH demodulation. The SFCI is configured to carry feedback information, such as the sidelink hybrid automatic repeat request (Sidelink HARQ), the acknowledgement (ACK)/non-acknowledgement (NACK), the sidelink scheduling request (Sidelink SR), and the sidelink channel state information (Sidelink CSI).

At present, two sidelink resource allocation modes are supported in NR-V2X sidelink communications. The first mode is that an access network device schedules a sidelink resource to the first terminal for sidelink communication. The second mode is that the first terminal determines a sidelink resource. In the first mode, the access network device first informs the first terminal of a resource for sidelink transmission by Physical Downlink Control Channel (PDCCH). The resource can be one resource or two resources that are at different times. However, if the first terminal fails to send sidelink data on both of the two resources, the access network device will not reschedule a resource to the first terminal. In this case, a large time delay will be caused. Currently, this problem can be solved in two ways.

One way is that the first terminal feeds the HARQ-ACK codebook back to the access network device to notify it of the need to retransmit a resource. Illustratively, this way is shown in FIG. 1. The access network device notifies the first terminal 10, by the PDCCH, of the two resources at different times for sidelink transmission. In a case where the first terminal 10 fails to send sidelink data to the second terminal 20 on these two resources by the PSCCH or the PSSCH, the first terminal sends NACK to the access network device.

Figure 2:
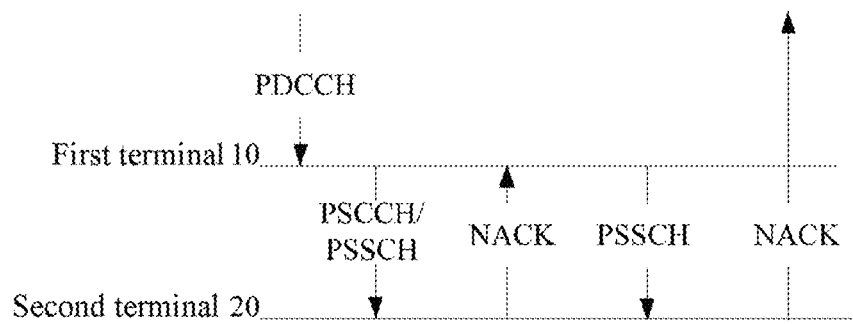

The other way is that the second terminal feeds the HARQ-ACK codebook back to the access network device to notify the first terminal of the need to retransmit a resource. Illustratively, this way is shown in FIG. 2. The access network device notifies the first terminal 10, by the PDCCH, of the two resources at different times for sidelink transmission. In a case where the first terminal 10 fail to send sidelink data to the second terminal 20 on these two resources by the PSCCH or the PSSCH, the second terminal 20 sends NACK to the access network device.

The 3GPP meeting has decided to take the first way, i.e., the way in which the first terminal feeds the HARQ-ACK codebook back to the access network device.

The HARQ is a technology that combines the forward error correction (FEC) and the automatic repeat request (ARQ).

Figure 3:
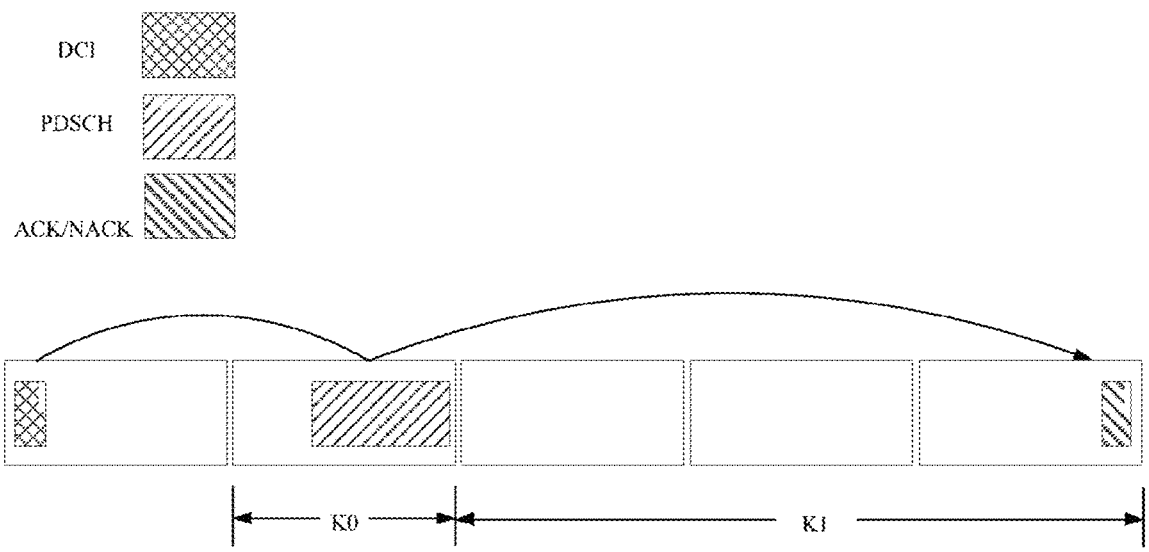

The time indication for the downlink data scheduling is as shown in FIG. 3. In 5G NR, the units of K0 and K1 are time slots. K0 represents the time interval between the PDSCH and the PDCCH, the PDSCH is configured to transmit downlink data, and the PDCCH is configured to transmit DCI. K1 represents the time interval between the HARQ-ACK codebook and the PDSCH, and the HARQ-ACK codebook can be carried by the PUCCH and the PUSCH.

Figure 4:
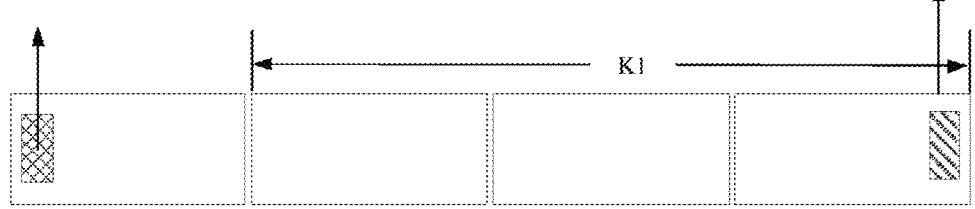

The downlink semi-persistent scheduling (SPS) PDSCH is a periodic downlink PDSCH resource semi-statically assigned by an access network device. For SPS PDSCH, the first terminal also feeds back the HARQ-ACK codebook. The timing relationship between SPS PDSCH and the HARQ-ACK codebook is indicated in DCI. DCI for indicating the downlink SPS deactivation also requires the first terminal to feed back the HARQ-ACK codebook, and the time indication is shown in FIG. 4.

Figure 5:
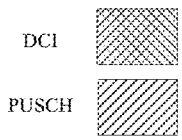
Figure 5:
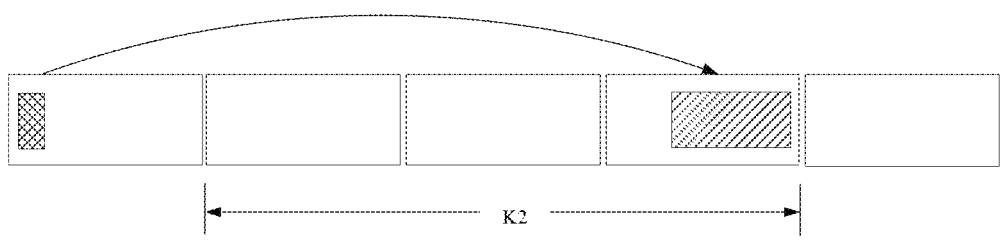

As shown in FIG. 5, the first terminal receives DCI sent by the access network device, and K2 in the DCI is configured to indicate the time interval between the HARQ-ACK codebook and the PDCCH. The first terminal activates downlink SPS in accordance with the indication of the DCI, and sends the HARQ-ACK codebook corresponding to the DCI to the access network device by the PUSCH.

Two types of HARQ-ACK codebooks are supported in NR. One is Type 1 HARQ-ACK codebook, and the other is Type 2 HARQ-ACK codebook. The HARQ-ACK codebook in embodiments of the present disclosure is mainly Type 1 HARQ-ACK codebook.

In NR, the DCI format for downlink scheduling PDSCH includes DCI Format 1_0 and DCI Format 1_1. The DCI in either of the formats includes a time domain resource assignment field, which is configured to notify the position of the PDSCH time domain resource used by the first total segment. DCI is scheduled to indicate the orthogonal frequency division multiplexing (OFDM) symbol for PDSCH transmission by indicating the index of a time domain resource assignment table. The OFDM symbol includes the start OFDM symbol and the length of the assigned OFDM symbol. The time interval between the scheduling DCI and the transmission PDSCH is K0 (in time slot). PDSCH is mapped in Type A or Type B. The time domain resource assignment table is configured by higher layer signaling.

The codebook type of the HARQ-ACK codebook includes one of a semi-static HARQ-ACK codebook and a dynamic HARQ-ACK codebook. As for the semi-static HARQ-ACK codebook, since the NR has many more new functions and is more flexible in comparison with the LTE, this also increases the complexity of the semi-static HARQ-ACK codebook. Factors affecting the semi-static HARQ-ACK codebook include, but are not limited to, a PDCCH monitoring time, semi-static DL/UL assignment, time domain resource allocation, the number of bits of HARQ-ACK and the number of cells required for each PDSCH.

The NR supports multiple monitoring times in one time slot, at each of which PDSCH can be scheduled, and multiple PDSCHs can be scheduled in one time slot. Also, the NR supports time domain resource allocation. When the PDSCH mapping is in Type B, each PDSCH can occupy 2, 4, or 7 OFDM symbols. The start OFDM symbol of each PDSCH is not limited, and multiple PDSCHs can be transmitted in one slot. Therefore, the HARQ-ACK feedback needs to be performed on multiple PDSCHs. In case of the semi-static HARQ-ACK codebook, all possibilities (including the worst one) need to be considered in determining the number of bits of the HARQ-ACK codebook. This, though ensuring that in the case of missing detection by the DCI, the HARQ-ACK codebooks of other PDSCHs can be correctly fed back, causes a serious waste of PUCCH resources. Therefore, in designing a semi-static HARQ-ACK codebook, the codebook should be as short as possible. The current design of semi-static HARQ-ACK codebooks takes into account the semi-static uplink and downlink configuration of the cell by eliminating the conflict between the downlink scheduling and the semi-static uplink and downlink configuration of the cell, so as to reduce the size of a semi-static codebook. In addition, if the first terminal does not report the capability to receive multiple PDSCHs in one time slot, the first terminal will be considered to receive only one PDSCH in one time slot; otherwise, the first terminal determines the length of a semi-static HARQ-ACK codebook by determining the maximum possible PDSCHs received in each time slot, based on the time domain resource assignment.

Figure 6:
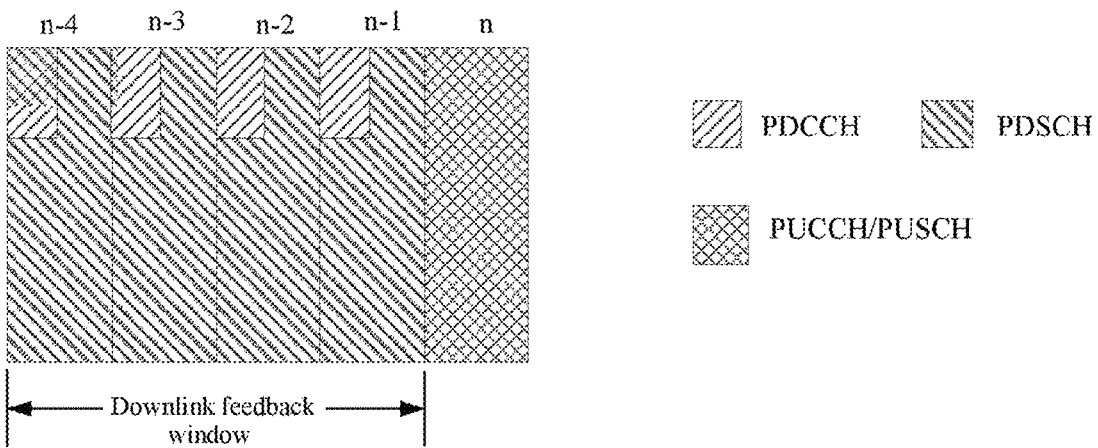

As shown in FIG. 6, for a certain cell, the first terminal feeds back the HARQ-ACK codebook in time slot n, the higher layer signaling configures DCI Format 1_0, the set of K1 is {1, 2, 3, 4}, the first terminal receives PDSCH in the downlink feedback window (i.e., within time slots n-4, n-3, n-2, n-1), and the first terminal feeds the corresponding HARQ-ACK codebook back to an access network device on the PUCCH or the PUSCH in time slot n. The set of K0 is {0}, and is obtained from the time domain resource assignment table configured by higher layer signaling.

In the related art, since Type 1 HARQ-ACK codebook is generated based on the PDSCH time domain resources, the first terminal cannot associate a sidelink resource, when contained in the DCI, with the PDSCH SLIV. To solve this problem, an embodiment of the present disclosure provides a feedback information transmission method, by which in a case where sidelink HARQ-ACK information needs to be sent within a target time unit, a first terminal sends a sidelink HARQ-ACK codebook via a physical uplink channel within the target time unit. Thus, the first terminal can support data transmission when the sidelink HARQ-ACK information needs to be sent within the target time unit, thereby avoiding the situation in the related art that the first terminal cannot associate sidelink resource, when included in the DCI, with the PDSCH SLIV, and ensuring a success rate of feeding back a sidelink HARQ-ACK codebook in a sidelink communication scenario.

Figures 7, 8:
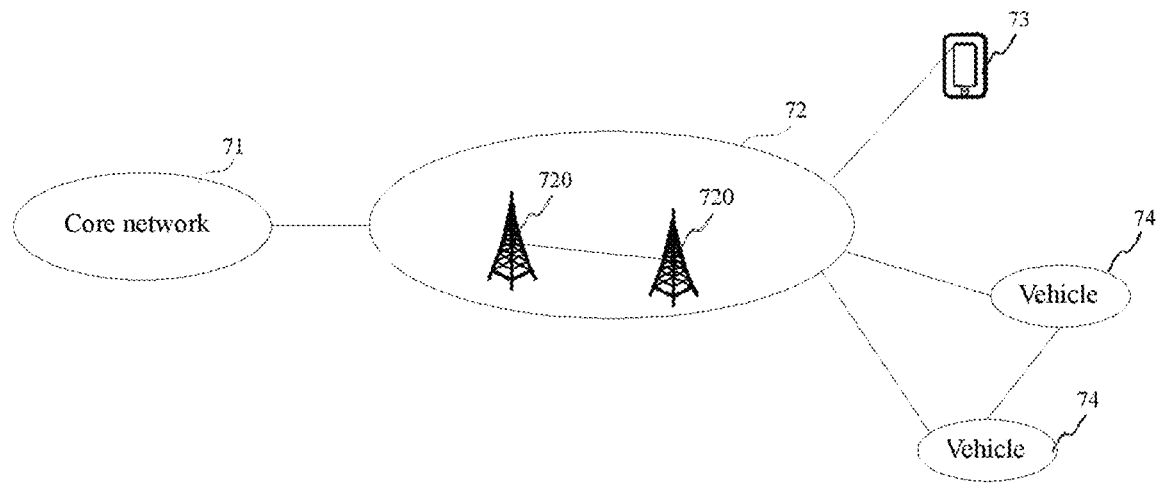
FIG. 7 shows a schematic diagram of network architecture possibly applicable to embodiments of the present disclosure.
FIG. 8 is a flowchart showing a feedback information transmission method according to an exemplary embodiment.

FIG. 7 shows a schematic diagram of network architecture possibly applicable to the embodiments of the present disclosure. The network architecture can be network architecture of a C-V2X system. C refers to cellular. The C-V2X system is an in-vehicle wireless communication system evolved from cellular network communication systems such as 3G, 4G, or 5G. The network architecture can include a core network 71, an access network 72, a terminal 73, and a vehicle 74.

The core network 71 includes several core network devices. The function of the core network device is mainly to provide user connections, manage users, and bear services, as a bearer network for providing an interface to an external network. For example, the core network of the long term evolution (LTE) system can include a mobility management entity (MME), a serving gateway (S-GW), and a PDN gateway (P-GW), among other devices. The core network of the 5G NR system can include an access and mobility management function (AMF) entity, a user plane function (UPF) entity, and a session management function (SMF) entity, among other devices.

The access network 72 includes a number of access network devices 720. The access network device 720 and the core network device 770 communicate with each other by means of a certain interface technology, e.g., the S7 interface in the LTE system and the NG interface in the 5G NR system. The access network device 720 can be a base station (BS), which is an apparatus deployed in an access network to provide a wireless communication function for a terminal. The base station can include, for example, macro base stations, micro base stations, relay stations, and access points in various forms. In systems having different radio access technologies adopted, devices functioning as base stations can vary in names. For example, in LTE systems, the devices are called eNodeB or eNB; in 5G NR systems, the devices are called gNodeB or gNB. As the communication technology evolves, the name "base station" may be changed. For description convenience, in embodiments of the present disclosure, the above-mentioned apparatuses that provide a terminal with a wireless communication function are collectively referred to as an access network device.

The terminal 73 can include various handheld devices, in-vehicle devices, wearable devices, computing devices or other processing devices connected to a wireless modem that have a wireless communication function, as well as the user equipment (UE), the mobile stations (MSs), and terminal devices in various forms, among others. For description convenience, the devices mentioned above are collectively referred to as a terminal. The access network device 720 and the terminal 73 communicate with each other by means of an air interface technology, such as a Uu interface.

The vehicle 74 can be a self-driving vehicle or a non-self-driving vehicle. The vehicle 74 is equipped with an in-vehicle device, through which the vehicle 74 communicates with other vehicles, the terminal 73 or other devices, e.g., a roadside unit (RSU). The in-vehicle device can also be called an in-vehicle terminal, an in-vehicle communication apparatus, or something else, which is not limited in the embodiments of the present disclosure. The in-vehicle device can be an apparatus integrated in the Telematics BOX (T-BOX), or an apparatus separable from the vehicle body. Also, the in-vehicle device can be installed in the vehicle 74 before or after the vehicle 74 leaves the factory.

The in-vehicle device of the vehicle 74 and other devices (e.g., other in-vehicle devices, the terminal 73, and a RSU) can communicate with each other via a sidelink communication interface (e.g., a PC5 interface). Accordingly, the communication link established based on the sidelink communication interface can be called a sidelink. Also, the communication between the in-vehicle device of the vehicle 74 and other devices can be transferred via the access network 72 and the core network 71. That is, the in-vehicle device of the vehicle 74 and other devices can communicate with each other via the communication link between the terminal 73 and the access network device 720 in the original cellular network. Compared with the communication based on a Uu interface, the communication based on a sidelink communication interface is characterized by short delay, low costs, etc., and is suitable for the communication between in-vehicle devices and other peripheral devices that are geographically close to each other.

The above network architecture shown in FIG. 7 can implement V2X service scenarios. This network architecture can further include RSUs, V2X application servers, and V2X control function nodes, among other devices, which is not limited in the embodiments of the present disclosure. The technical solutions described in the embodiments of the present disclosure are applicable to the 5G NR system, and are also applicable to a future evolution system of the 5G NR system.

In the embodiments of the present disclosure, there is provided a feedback information transmission method for the sidelink communication scenario among the V2X service scenarios as described above, in order to solve the technical problem mentioned above.

In the embodiments of the present disclosure, the first terminal and the second terminal are two terminal devices for performing the sidelink communication in the V2X service scenario. A sidelink can be established between the first terminal and the second terminal via a sidelink communication interface (e.g., a PC5 interface), and then, user plane data and control plane signaling are interacted via the sidelink. For example, the first terminal can be the in-vehicle device of the vehicle 74 in the network architecture shown in FIG. 7, and the second terminal can be an in-vehicle device of another vehicle, or the terminal 73, or a RSU. As another example, the first terminal can be the terminal 73 in the network architecture shown in FIG. 7, and the second terminal can be another terminal, or the in-vehicle device of the vehicle 74, or a RSU. In some embodiments, the same device (e.g., the same in-vehicle device or the same terminal) can serve as a first terminal in some scenarios, and serve as a second terminal in other scenarios.

In the embodiments of the present disclosure, the first terminal is also referred to as sidelink communication transmitter user equipment (Transmitter UE), and the second terminal is also referred to as sidelink communication receiver user equipment (Receiver UE).

The network architecture and service scenarios described in the embodiments of the present disclosure are intended to illustrate the technical solutions of the embodiments of the present disclosure in a clearer manner, and do not constitute a limitation on the technical solutions provided in the embodiments of the present disclosure. It is known to those of ordinary skill in the art that as the network architecture evolves and new service scenarios emerge, the technical solutions provided in the embodiments of the present disclosure are likewise applicable to similar technical problems.

It should be noted that some of the terms involved in the embodiments of the present disclosure can be referred to the corresponding descriptions in the 3GPP protocol, including DCI, PDCCH, PSCCH, PSSCH, PSFCH, SCI, and ACK/NACK. No more details thereof are given herein.

The technical solution of the present disclosure will be introduced and explained hereinafter by means of several exemplary embodiments.

FIG. 8 is a flowchart showing a feedback information transmission method according to an exemplary embodiment. This method may be applied to the network architecture as shown in FIG. 7. The method comprises steps described below.

In 801, in response to a need to send sidelink HARQ-ACK information within a target time unit, a first terminal sends a sidelink HARQ-ACK codebook via a physical uplink channel within the target time unit, the sidelink HARQ-ACK codebook including sidelink HARQ-ACK information corresponding to at least one sidelink data.

The sidelink HARQ-ACK information is configured to indicate a receiving state corresponding to the sidelink data, and the sidelink data is physical layer data sent by the first terminal via a sidelink.

Optionally, the sidelink data is physical layer data sent by the first terminal to a second terminal via the sidelink. The receiving state corresponding to the sidelink data includes ACK or NACK. ACK is configured to indicate that the sidelink data is received correctly by the second terminal. NACK includes an unreceived state and/or an incorrectly received state. The unreceived state is configured to indicate that the sidelink data is not received by the second terminal. The incorrectly received state is configured to indicate that sidelink data is received by the second terminal, but the sidelink data received by the second terminal is different from the sidelink data sent by the first terminal. That is, the second terminal receives incorrect sidelink data, i.e., a failure to receive valid sidelink data.

Optionally, the target time unit refers to a corresponding time unit when the terminal needs to feed back the sidelink HARQ-ACK codebook. Illustratively, the target time unit includes at least one symbol, or symbol group, or time slot, or subframe, which is not limited in the present embodiment. In the following description, only one time slot is taken as an example of the target time unit.

Optionally, the physical uplink channel within the target time unit is an uplink channel between the first terminal and the access network device. The physical uplink channel is an uplink channel used to send the sidelink HARQ-ACK codebook to the access network device. Illustratively, the physical uplink channel is the PUCCH.

In summary, in the present embodiment, in a case where sidelink HARQ-ACK information needs to be sent within a target time unit, a first terminal sends a sidelink HARQ-ACK codebook on a physical uplink channel within the target time unit. Thus, the first terminal can support data transmission when the sidelink HARQ-ACK information needs to be sent within the target time unit, thereby avoiding the situation in the related art that the first terminal cannot associate sidelink resource, when included in the DCI, with the PDSCH SLIV, and ensuring a success rate of feeding back a sidelink HARQ-ACK codebook in a sidelink communication scenario.

Figure 9:
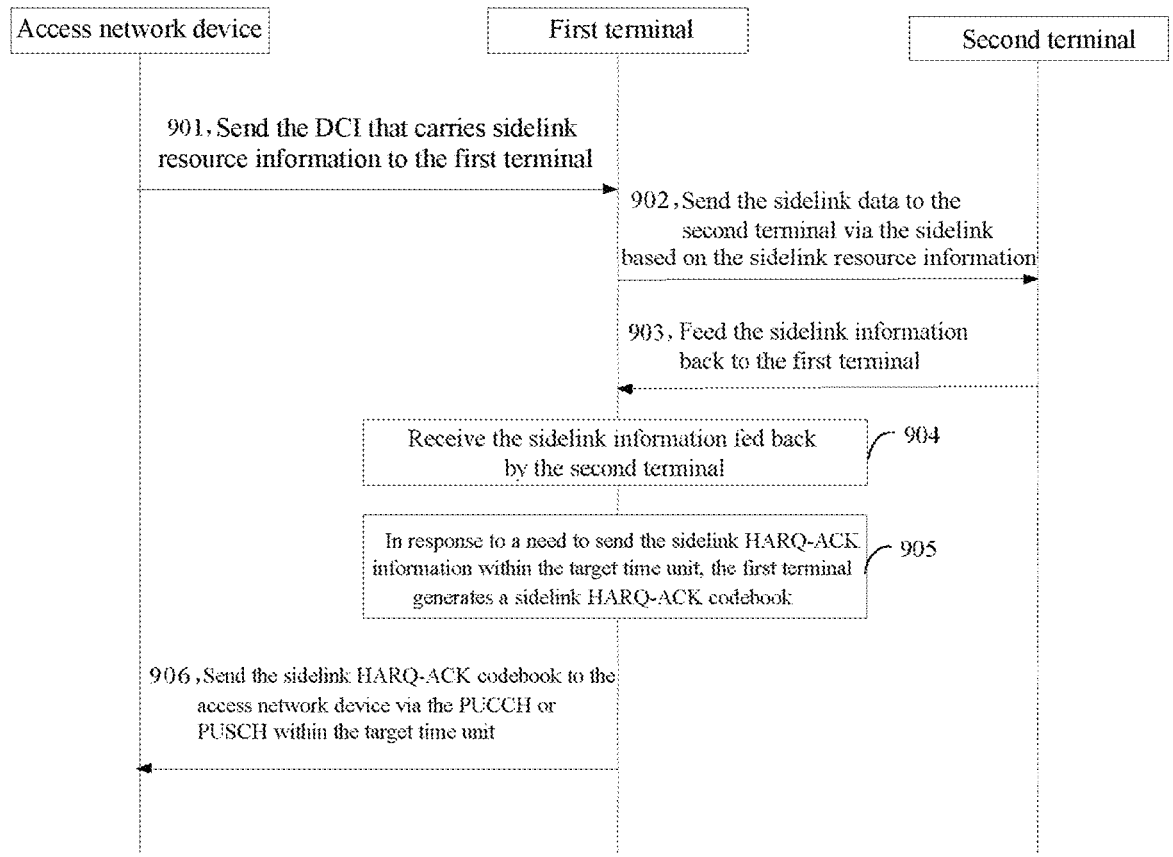
FIG. 9 is a flowchart showing a feedback information transmission method according to another exemplary embodiment.

FIG. 9 is a flowchart showing a feedback information transmission method according to another exemplary embodiment. This method is applicable to the network architecture shown in FIG. 7. The method can include the steps described below.

In 901, the access network device sends the DCI that carries sidelink resource information, to the first terminal.

The access network device sends the DCI to the first terminal by a downlink channel. Illustratively, the downlink channel includes the PDCCH.

The sidelink resource information includes one or more pieces of sidelink resource information. Optionally, the sidelink resource information is configured to indicate a time-frequency resource and/or a modulation and coding scheme.

Optionally, before sending the DCI to the first terminal, the access network device configures a time-interval set for the first terminal by higher layer signaling. The time-interval set is configured to indicate a target time unit for the first terminal to feed back sidelink HARQ-ACK information corresponding one piece or more pieces of sidelink data. For example, the first time-interval set is set K3 {k1, k2, k3 . . . kn}.

Optionally, the DCI also carries the first time-interval set. Illustratively, the first terminal receives the DCI sent by the access network device in time slot n, and the target time unit is time slot n+$k_i$. That is, in a case where the first terminal needs to feed back the sidelink HARQ-ACK codebook in time slot n+$k_i$, the first terminal may receive multiple pieces of sidelink resource information before the time slot n+$k_i$, and the first terminal is required to feed back all the codebooks in the time slot n+$k_i$. Both n and $k_i$ are positive integers.

In 902, the first terminal sends the sidelink data to the second terminal via the sidelink based on the sidelink resource information.

The first terminal sends the sidelink data to the second terminal via the sidelink based on the time-frequency resource and/or the modulation and coding mode indicated by the sidelink resource information. Optionally, the second terminal includes one or more second terminals.

It should be noted that the mode of sidelink communication between the first terminal and the second terminal in the embodiments of the present disclosure is a sidelink communication mode based on the scheduling of an access network device. That is, the first terminal sends data based on the scheduling of an access network device. For the sidelink communication mode based on the scheduling of an access network device, since the scheduling is performed by the access network device side, the sidelink HARQ-ACK codebook corresponding to the sidelink data needs to be transmitted from the second terminal back to the access network device, in order for the access network device side to schedule data retransmission or new data transmission. In consideration of the fact that the first terminal and the second terminal may be within the coverage of different access network devices, or outside the network coverage, the sidelink HARQ-ACK codebook needs to be transmitted from the second terminal to the first terminal before it is reported by the first terminal to the access network device.

The sidelink data is physical layer data sent by the first terminal to the second terminal via the sidelink.

Optionally, the first terminal sends the sidelink data to the second terminal based on a time-frequency resource indicated by the sidelink resource information.

In 903, the second terminal feeds the sidelink information back to the first terminal.

Correspondingly, the second terminal receives the sidelink data sent by the first terminal. Optionally, the second terminal receives the sidelink data sent by the first terminal based on a target time-frequency resource of the sidelink.

The second terminal feeds the sidelink information back to the first terminal, and the sidelink information is configured to indicate a receiving state of the sidelink data received from the first terminal by the second terminal. The sidelink information includes ACK or NACK corresponding to at least one piece of sidelink data.

Optionally, the second terminal sends the sidelink information to the first terminal by the PSFCH.

In 904, the first terminal receives the sidelink information fed back by the second terminal.

Correspondingly, the first terminal receives the sidelink information sent by the second terminal by the PSFCH.

In 905, when the sidelink HARQ-ACK information needs to be sent within the target time unit, the first terminal generates a sidelink HARQ-ACK codebook.

The sidelink HARQ-ACK codebook includes sidelink HARQ-ACK information corresponding to at least one piece of sidelink data. The sidelink HARQ-ACK information is configured to indicate a receiving state corresponding to the sidelink data, and the sidelink data is physical layer data sent by the first terminal via the sidelink.

Optionally, the first terminal generates the sidelink HARQ-ACK codebook, which includes, but is not limited to, the following two possible implementations:

In one possible implementation, the first terminal generates the sidelink HARQ-ACK codebook based on a time domain position of a resource pool of a sidelink channel that includes PSSCH or PSFCH.

In the other possible implementation, the first terminal generates the sidelink HARQ-ACK codebook based on a monitoring time of a PDCCH and the length of the CORE-SET where the monitoring time is located.

It should be noted that the two possible implementations described above can be carried out with reference to the relevant details in the following embodiments, which are not described in this section.

In 906, the first terminal sends the sidelink HARQ-ACK codebook to the access network device via the PUCCH or PUSCH within the target time unit.

The first terminal sends the sidelink HARQ-ACK codebook to the access network device on the PUCCH or PUSCH within the target time unit. Correspondingly, the access network device receives the sidelink HARQ-ACK codebook sent on the physical uplink channel within the target time unit.

In a possible implementation, 905 may be replaced by the following step: in response to a need to send sidelink HARQ-ACK information within a target time unit, the first terminal generates a sidelink HARQ-ACK codebook based on a domain position of a resource pool of a sidelink channel that includes PSSCH or PSFCH.

During the generation of the sidelink HARQ-ACK codebook, the number of bits of the sidelink HARQ-ACK codebook and/or the arrangement of the sidelink HARQ-ACK codebook can also be defined.

Optionally, generating, by the first terminal, the sidelink HARQ-ACK codebook based on a time domain position of a resource pool of a sidelink channel comprises: traversing a plurality of the resource pools of the first terminal, and generating, for each of the resource pools, sidelink HARQ-ACK information respectively corresponding to the resource pool based on the time domain position of the sidelink channel in the resource pool; and sorting sidelink HARQ-ACK information corresponding to the plurality of resource pools in an ascending order of indexes of the resource pools, to obtain the sidelink HARQ-ACK codebook.

Optionally, the target time unit is time slot m, with m being a positive integer, for example, a method for determining the number of bits of the sidelink HARQ-ACK information generated in correspondence to each time slot of the resource pool comprises: receiving, by the first terminal, a first time-interval set configured by an access network device based on higher layer signaling, wherein the first time-interval set comprises a set of a time slot where an end symbol of the sidelink channel is located and slot offsets $k_i$ with which the sidelink HARQ-ACK codebook is fed back, both i and $k_i$ being positive integers; traversing a plurality of slot offsets $k_i$ in the first time-interval set, and determining, for each time slot m-$k_i$, the number of one or more sidelink channels allowed to be sent in the time slot m-$k_i$; and determining, for each of the plurality of the resource pools of the first terminal, a number of bits of sidelink HARQ-ACK information generated in correspondence to each time slot of the resource pool, based on the number of one or more PSSCHs allowed to be sent in the time slot m-$k_i$.

Illustratively, in a case where the sidelink channel includes the PSSCH, the first time-interval set comprises a set of a time slot where an end symbol of the PSSCH resource scheduled from the access network device is located and slot offsets $k_i$ the sidelink HARQ-ACK codebook is fed back.

Illustratively, in a case where the sidelink channel includes the PSFCH, the first time-interval set comprises a set of a time slot where an end symbol of the PSFCH resource received from the first terminal is located and slot offsets $k_i$ with which the sidelink HARQ-ACK codebook is fed back.

It should be noted that the present embodiment does not limit the order in which the first terminal traverses the plurality of resource pools of the first terminal and traverses the plurality of slot offsets $k_i$ in the first time-interval set.

Optionally, the number of bits of the sidelink HARQ-ACK information corresponding to each time slot of the resource pool includes: one; or at most P; or at most P*Q.

P is a number of the sidelink channels accommodable in one time slot at a minimum resource granularity in time domain configured by the higher layer signaling to send the sidelink channels in configuring the resource pool. Q is a number of pre-configured frequency-domain units divided in the resource pool based on a use of a minimum frequency-domain resource.

Optionally, the implementation of determining, by the first terminal, the number of bits of sidelink HARQ-ACK information generated in correspondence to each time slot of the resource pool, based on the number of one or more sidelink channels allowed to be sent in the time slot m-$k_i$ includes, but is not limited to, the following three possible implementations:

In one possible implementation, if the number of one or more sidelink channels allowed to be sent in the time slot m-$k_i$ is one, the number of bits of the sidelink HARQ-ACK information generated in correspondence to each time slot of the resource pool is determined to be one.

In another possible implementation, if the number of one or more sidelink channels allowed to be sent in the time slot m-$k_i$ is greater than one, the number of bits of the sidelink HARQ-ACK information generated in correspondence to each time slot of the resource pool is determined to be at most P.

In yet another possible implementation, if different frequency-domain units of the time slot m-$k_i$ allow a plurality of sidelink channels to be transmitted, the number of bits of the sidelink HARQ-ACK information generated in correspondence to each time slot of the resource pool is determined to be at most P*Q.

P is a number of the sidelink channels accommodable in one time slot at a minimum resource granularity in time domain configured by the higher layer signaling to send the sidelink channels in configuring the resource pool. Q is a number of pre-configured frequency-domain units divided in the resource pool based on a use of a minimum frequency-domain resource.

Optionally, the first terminal determines whether the time slot m-$k_i$ is a possible time domain position for the sidelink channel, based on time domain resource information of the sidelink channel in the resource pool. If it is determined that the time slot m-$k_i$ is a possible time domain position for the sidelink channel, the first terminal determines the number of bits of sidelink HARQ-ACK information generated in correspondence to each time slot of the resource pool, based on the number of one or more sidelink channels allowed to be sent in the time slot m-$k_i$.

It should be noted that in the V2X system, both PSCCH and PSSCH are transmitted in their respective resource pools. The resource pool comprises two parts: a time domain set and a frequency domain set, which are usually configured by a higher layer parameter. The first terminal sends PSCCH/PSSCH only in the transmission resource pool, and the second terminal receives PSCCH/PSSCH only in the receiving resource pool. Illustratively, when the sidelink channel includes the PSSCH, the first terminal determines whether the time slot m-ki is a possible time domain position for the PSSCH, based on the time domain resource information of the PSSCH in the resource pool.

Figure 10:
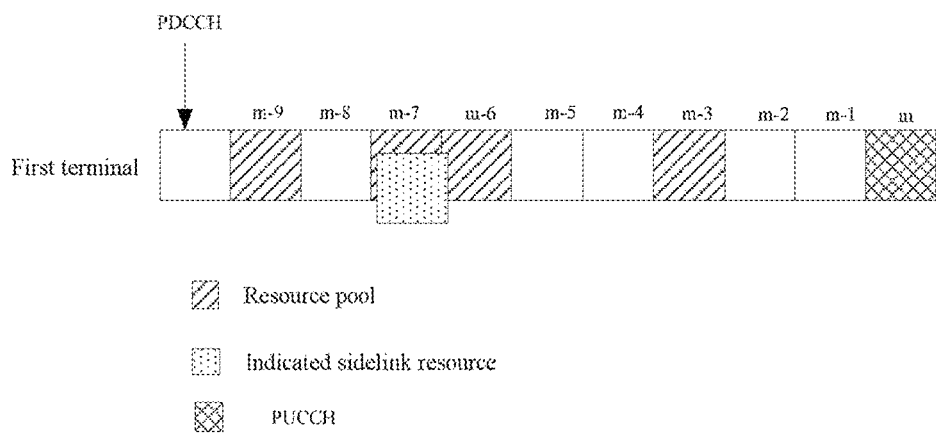
FIG. 10 is a schematic diagram showing the principle involved in a feedback information transmission method according to an exemplary embodiment.

In an illustrative example, the sidelink channel includes the PSSCH. As shown in FIG. 10, P=1, Q=1, the first time-interval set K3={7, 8, 9}, the target time unit is time slot m, and the four resource pools of the first terminal correspond to time slots m-9, m-7, m-6, and m-3, respectively. The first terminal determines that time slot m-7 is a possible time domain position for the PSSCH, based on the time domain resource information of the PSSCH in the resource pool. The access network device sends the DCI to the first terminal by the PDCCH, and the DCI carries the indicated sidelink resource, namely time slot m-7. Correspondingly, after sending the sidelink data to the second terminal using time slot m-7, the first terminal receives ACK as the sidelink information fed back by the second terminal. ACK indicates that the sidelink data in time slot m-7 is received correctly by the second terminal. Then, the sidelink HARQ-ACK information that the first terminal feeds back to the access network device on the PUCCH in time slot m is {NACK, ACK, NACK}. The first NACK means that the sidelink data in time slot m-9 is not received, or the valid sidelink data is not received. The first ACK means that the sidelink data in time slot m-7 is received correctly. The second NACK means that the sidelink data in time slot m-6 is not received, or the valid sidelink data is not received.

Another aspect to be noted is that in the V2X system, the time offset between the PSSCH and the PSFCH is determined semi-statically, without any implicit notification. Moreover, multiple PSSCH resources can correspond to one PSFCH resource, and the period can be 1, 2, or 4. Illustratively, when the sidelink channel includes the PSFCH, the first terminal determines whether the time slot m-$k_i$ is a possible time domain position for the PSFCH, based on the time domain resource information of the PSFCH in the resource pool, the time slot offset between the PSSCH and the PSFCH, and the feedback period of the PSSCH and the PSFCH.

Figure 11:
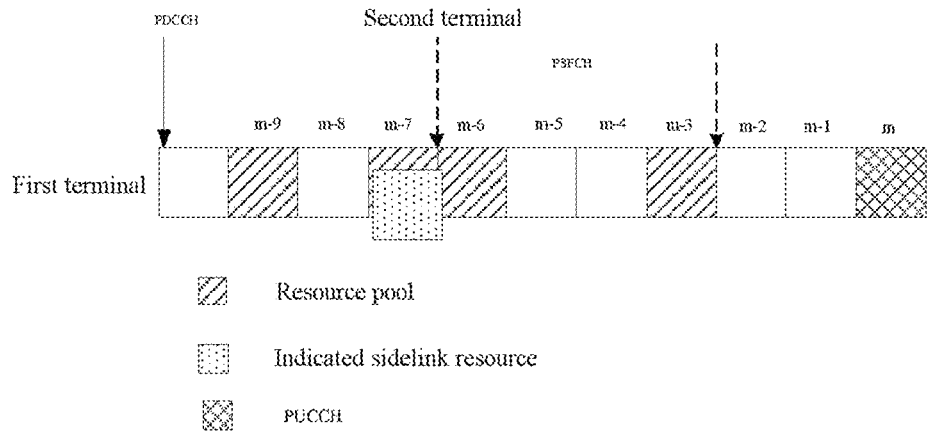
FIG. 11 is a schematic diagram showing the principle involved in a feedback information transmission method according to another exemplary embodiment.

In an illustrative example, the sidelink channel includes PSFCH. As shown in FIG. 11, P=1, Q=1, the first time interval set K3={3,4,5,6,7}, the time offset between PSFCH and PSSCH is 4 time slots, the four resource pools of the first terminal correspond to time slots m-9, m-7, m-6 and m-3, respectively, and the period of PSFCH and PSSCH is 2.

Thus, the first terminal determines that a possible position of the PSFCH includes time slots m-7 and m-3, based on the time domain resource information of the PSFCH in the resource pool, the time slot offset between the PSSCH and the PSFCH, and the feedback period of the PSSCH and the PSFCH.

The sidelink resource indicated by the access network device to the first terminal via the PDCCH is time slot m-7, and the sidelink information that the first terminal receives from the second terminal in time slot m-3 is NACK+ACK. NACK means that the sidelink data in time slot m-7 is not received, or the valid sidelink data is not received. ACK means that the sidelink data in time slot m-3 received correctly. Then, the sidelink HARQ-ACK information that the first terminal feeds back to the access network device via the PUCCH in time slot m is {NACK, NACK, NACK, ACK}. The first NACK means that the sidelink data in time slot m-9 is not received, or the valid sidelink data is not received. The second NACK means that the sidelink data in time slot m-7 is not received, or the valid sidelink data is not received. The third NACK means that the sidelink data in time slot m-6 is not received, or the valid sidelink data is not received. The first ACK means that the sidelink data in time slot m-3 is received correctly.

To sum up, in the present embodiment, the first terminal generates the sidelink HARQ-ACK codebook based on a time domain position of a resource pool of the sidelink channel, thereby diversifying the method of generating the sidelink HARQ-ACK codebook. This further ensures the success rate of the subsequent transmission of the sidelink HARQ-ACK codebook.

In a possible implementation, 905 may be replaced by the following step: in response to a need to send sidelink HARQ-ACK information within a target time unit, the first terminal generates a sidelink HARQ-ACK codebook based on a monitoring time of a PDCCH and a length of a CORESET where the monitoring time is located.

Optionally, generating, by the first terminal, the sidelink HARQ-ACK codebook based on a monitoring time of a PDCCH and a length of a CORESET where the monitoring time is located comprises: receiving a second time-interval set configured by an access network device for the first terminal, wherein the second time-interval set includes a set of a time when the first terminal receives scheduling sidelink DCI and slot offsets $k_i$ with which the sidelink HARQ-ACK codebook is fed back, both i and $k_i$ being positive integers; and traversing a plurality of slot offsets $k_i$ in the second time-interval set, and generating, for each of time slots m-$k_i$, the sidelink HARQ-ACK codebook based on a start symbol for the monitoring time of the PDCCH scrambled by a sidelink RNTI and the length of the CORESET where the monitoring time is located.

By traversing a PDSCH resource assignment table, the first terminal obtains the maximum number of PDSCHs that do not overlap in one time slot. The PDSCH resource assignment table may include several rows, and each of the rows indicates the start position and the symbol length. Optionally, the first terminal uses a start symbol for a monitoring time of a PDCCH scrambled by the sidelink RNTI and the length of the CORESET as a virtual row of resources, and calculates, together with the PDSCH resource assignment table, the maximum number of the PDSCHs and the number of the PDCCHs scrambled by the sidelink RNTI in one time slot. The number of the PDCCHs scrambled by the sidelink RNTI is precisely the number of DCIs that schedule the SCI. Based on the calculated number of the PDSCHs and/or number of the PDCCHs scrambled by the sidelink RNTI, the first terminal determines the number of bits of the sidelink HARQ-ACK information generated in correspondence to each time slot.

In a possible implementation, if the number of one or more PDCCHs scrambled by the sidelink RNTI that are allowed to be sent in the time slot m-$k_i$ is one, it is determined that the number of bits of the sidelink HARQ-ACK information generated in correspondence to each time slot is one.

Optionally, if the number of one or more PDCCHs scrambled by the sidelink RNTI that are allowed to be sent in the time slot m-$k_i$ is one, and the calculated number of the PDSCHs is one, it is determined that the number of bits of the sidelink HARQ-ACK information generated in correspondence to each time slot is two.

In another possible implementation, if the number of one or more PDCCHs scrambled by the sidelink RNTI that are allowed to be sent in the time slot m-$k_i$ is greater than one, it is determined that the number of bits of the sidelink HARQ-ACK information generated in correspondence to each time slot in the resource pool is at most K, K being the number of the PDCCHs scrambled by the sidelink RNTI which are configured by higher layer signaling.

Optionally, if the number of one or more PDCCHs scrambled by the sidelink RNTI that are allowed to be sent in the time slot m-$k_i$ is greater than one, and the calculated number of the PDSCHs is one, it is determined that the number of bits of the sidelink HARQ-ACK information generated in correspondence to each time slot is K+1.

It should be noted that the present embodiment does not limit how to define the number of bits of the sidelink HARQ-ACK information generated in correspondence to each time slot.

To sum up, in the present embodiment, the first terminal generates the sidelink HARQ-ACK codebook by determining the number of bits of the sidelink HARQ-ACK information generated in correspondence to each time slot, based on a monitoring time of a PDCCH and the length of the CORESET, thereby diversifying the method of generating the sidelink HARQ-ACK codebook. This further ensures the success rate of the subsequent transmission of the sidelink HARQ-ACK codebook.

Figure 12:
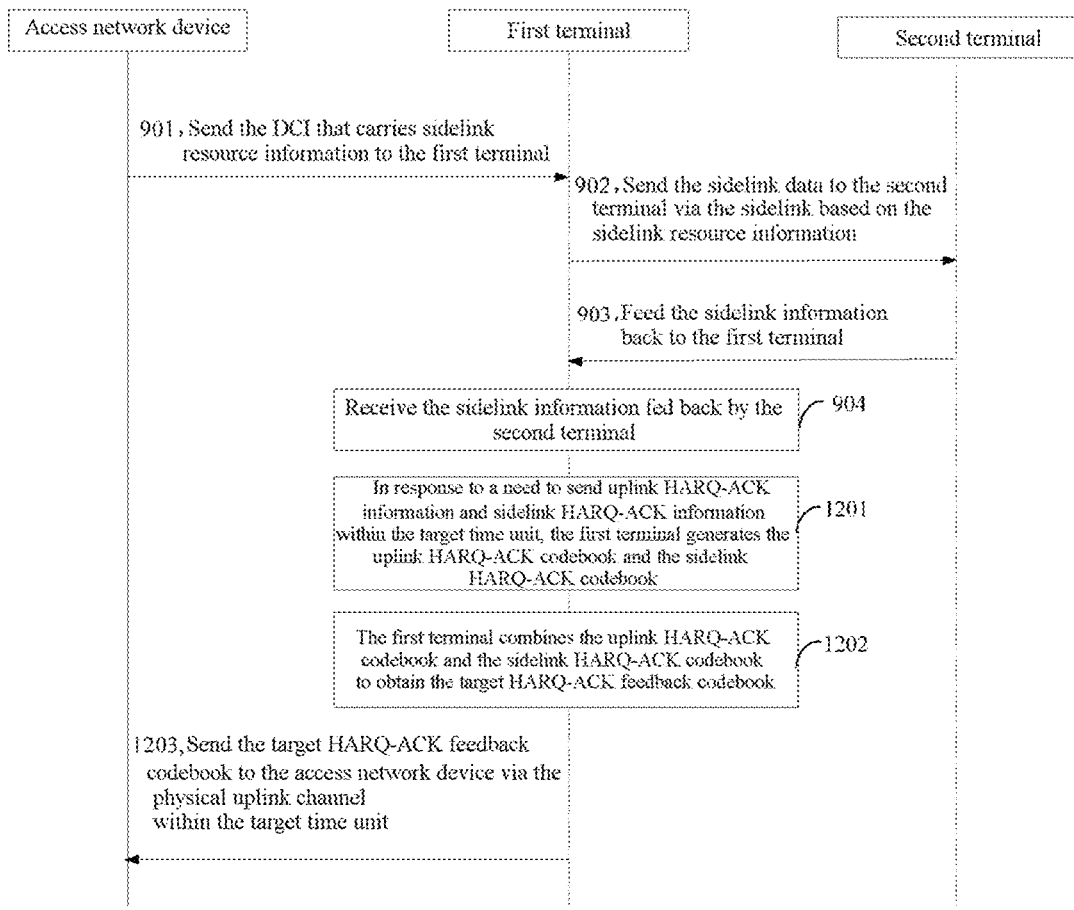
FIG. 12 is a flowchart showing a feedback information transmission method according to another exemplary embodiment.

It should be noted that in a case where uplink HARQ-ACK information and the sidelink HARQ-ACK information need to be sent within the target time unit, the first terminal sends a target HARQ-ACK feedback codebook via a physical uplink channel within the target time unit, the target HARQ-ACK feedback codebook including an uplink HARQ-ACK codebook and the sidelink HARQ-ACK codebook. 905 and 906 may be replaced by the following steps, as shown in FIG. 12:

In 1201, in response to a need to send uplink HARQ-ACK information and the sidelink HARQ-ACK information within the target time unit, the first terminal generates the uplink HARQ-ACK codebook and the sidelink HARQ-ACK codebook.

The uplink HARQ-ACK codebook comprises uplink HARQ-ACK information corresponding to at least one downlink data.

Optionally, before 1201, the access network device sends downlink data to the first terminal by a downlink channel. Correspondingly, the first terminal receives the downlink data sent by the access network device through the downlink channel. Illustratively, the downlink channel includes the PDSCH.

Optionally, in a case where uplink HARQ-ACK information and sidelink HARQ-ACK information need to be sent within the target time unit, the uplink HARQ-ACK codebook generated by the first terminal is also called an uplink HARQ-ACK subcodebook, and the sidelink HARQ-ACK codebook generated by the first terminal is also called a sidelink HARQ-ACK subcodebook.

The uplink HARQ-ACK information is configured to indicate a receiving state corresponding to the downlink data. The receiving state corresponding to the downlink data includes ACK or NACK. ACK is configured to indicate that the downlink data is received correctly by the first terminal. NACK includes an unreceived state and/or an incorrectly received state. The unreceived state is configured to indicate that the downlink data is not received by the first terminal. The incorrectly received state is configured to indicate that downlink data is received by the first terminal, but the downlink data received by the first terminal is different from the downlink data sent by the access network device. That is, the first terminal receives incorrect downlink data.

It should be noted that for the process of generating the sidelink HARQ-ACK codebook by the first terminal, which will not be repeated here, reference may be made to the relevant details in the embodiments described above.

In 1202, the first terminal combines the uplink HARQ-ACK codebook and the sidelink HARQ-ACK codebook to obtain the target HARQ-ACK feedback codebook.

Optionally, combining, by the first terminal, the uplink HARQ-ACK codebook and the sidelink HARQ-ACK codebook to obtain the target HARQ-ACK feedback codebook comprises combining, by the first terminal, the uplink HARQ-ACK codebook and the sidelink HARQ-ACK codebook in a predetermined order to obtain the target HARQ-ACK feedback codebook.

The codebook types corresponding to the uplink HARQ-ACK codebook and the sidelink HARQ-ACK codebook are both semi-static HARQ-ACK codebooks.

Before combining, by the first terminal, the uplink HARQ-ACK codebook and the sidelink HARQ-ACK codebook to obtain the target HARQ-ACK feedback codebook, the method further comprises sending, by the access network device, downlink signaling to the first terminal. Correspondingly, the first terminal receives the downlink signaling sent by the access network device. The downlink signaling is configured to indicate the codebook type of the configured target HARQ-ACK feedback codebook.

Optionally, the codebook type of the target HARQ-ACK feedback codebook includes either of a semi-static HARQ-ACK codebook and a dynamic HARQ-ACK codebook. When the codebook type of the target HARQ-ACK feedback codebook is a semi-static HARQ-ACK codebook, it is configured to indicate that the codebook types corresponding to the uplink HARQ-ACK codebook and the sidelink HARQ-ACK codebook are both semi-static HARQ-ACK codebooks.

Optionally, the predetermined order includes: an order that the sidelink HARQ-ACK codebook is sorted before the uplink HARQ-ACK codebook; or an order that the uplink HARQ-ACK codebook is sorted before the sidelink HARQ-ACK codebook. The present embodiment does not limit the sort order of the sidelink HARQ-ACK codebook and the uplink HARQ-ACK codebook.

In 1203, the first terminal sends the target HARQ-ACK feedback codebook to the access network device on the physical uplink channel within the target time unit.

Optionally, the first terminal receives third configuration information sent by the access network device, and determines the physical resource of the physical uplink channel within the target time unit based on the third configuration information.

Optionally, the physical uplink channel is an uplink channel configured to send the target HARQ-ACK feedback codebook to the access network device.

The first terminal sends the target HARQ-ACK feedback codebook to the access network device in the physical resource of the physical uplink channel within the target time unit. Correspondingly, the access network device receives the target HARQ-ACK feedback codebook sent by the first terminal.

To sum up, in the present embodiment, in a case where uplink HARQ-ACK information and the sidelink HARQ-ACK information need to be sent within the target time unit, the first terminal can send a target HARQ-ACK feedback codebook via a physical uplink channel within the target time unit, the target HARQ-ACK feedback codebook including an uplink HARQ-ACK codebook and the sidelink HARQ-ACK codebook. Thus, the first terminal can support data transmission in a case where uplink HARQ-ACK information and sidelink HARQ-ACK information need to be sent within the target time unit, which further ensures flexibility in feedback information transmission.

Here are device embodiments of the embodiments of the present disclosure. For the content that is not elaborated in the device embodiments, reference may be made to the technical details described in the foregoing method embodiments.

Figure 13:
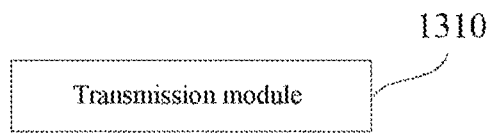
FIG. 13 shows a schematic structural diagram of a feedback information transmission apparatus provided by an embodiment of the present disclosure.

Referring to FIG. 13, there is shown a schematic structural diagram of a feedback information transmission apparatus provided by an embodiment of the present disclosure. The feedback information transmission apparatus can be implemented as all or a part of the first terminal by means of software, hardware, and a combination thereof. The feedback information transmission apparatus comprises a transmission module 1310.

The transmission module 1310 is configured, in response to a need to send sidelink HARQ-ACK information within a target time unit, to send, by a first terminal, a sidelink HARQ-ACK codebook via a physical uplink channel within the target time unit, the sidelink HARQ-ACK codebook including sidelink HARQ-ACK information corresponding to at least one sidelink data.

The sidelink HARQ-ACK information is configured to indicate a receiving state corresponding to the sidelink data, and the sidelink data is physical layer data sent by the first terminal via a sidelink.

In a possible implementation, the transmission module 1310 is further configured to generate the sidelink HARQ-ACK codebook; and send the sidelink HARQ-ACK codebook via a physical uplink control channel (PUCCH) or a physical uplink shared channel (PUSCH) within the target time unit.

In another possible implementation, the transmission module 1310 is further configured to send, in response to a need to send uplink HARQ-ACK information and the sidelink HARQ-ACK information within the target time unit, a target HARQ-ACK feedback codebook via a physical uplink channel within the target time unit, the target HARQ-ACK feedback codebook including an uplink HARQ-ACK codebook and the sidelink HARQ-ACK codebook.

The uplink HARQ-ACK codebook comprises uplink HARQ-ACK information corresponding to at least one downlink data.

In another possible implementation, the apparatus further comprises a processing module. The processing module is configured to generate the uplink HARQ-ACK codebook; generate the sidelink HARQ-ACK codebook; and combine the uplink HARQ-ACK codebook and the sidelink HARQ-ACK codebook to obtain the target HARQ-ACK feedback codebook.

In another possible implementation, the processing module is further configured to generate the sidelink HARQ-ACK codebook based on a time domain position of a resource pool of a sidelink channel, wherein the sidelink channel includes a PSSCH or a PSFCH.

In another possible implementation, the processing module is further configured to traverse a plurality of the resource pools of the first terminal, and generate, for each of the resource pools, sidelink HARQ-ACK information corresponding to the resource pool based on a time domain position of the sidelink channel in the resource pool; and sort sidelink HARQ-ACK information respectively corresponding to the plurality of the resource pools in an ascending order of indexes of the resource pools, to obtain the sidelink HARQ-ACK codebook.

In another possible implementation, in a case where the target time unit is a time slot m, m being a positive integer, the apparatus further comprises a receiving module.

The receiving module is configured to receive a first time-interval set configured by an access network device based on higher layer signaling, the first time-interval set including a set of a time slot where an end symbol of the sidelink channel is located and slot offset $k_i$ with which the sidelink HARQ-ACK codebook is fed back, both i and $k_i$ being positive integers.

The processing module is further configured to traverse a plurality of slot offsets $k_i$ in the first time-interval set, and determine, for each of time slots m-$k_i$, the number of one or more PSSCHs allowed to be sent in the time slot m-$k_i$; and determine, for each of the plurality of the resource pools of the first terminal, the number of bits of sidelink HARQ-ACK information generated in correspondence to each time slot of the resource pool, based on the number of one or more sidelink channels allowed to be sent in the time slot m-$k_i$.

In another possible implementation, the processing module is further configured to determine whether the time slot m-$k_i$ is a possible time domain position for the sidelink channel, based on time domain resource information of the sidelink channel in the resource pool; and determine, in a case where the time slot m-$k_i$ is determined to be a possible time domain position for the sidelink channel, the number of bits of sidelink HARQ-ACK information generated in correspondence to each time slot of the resource pool, based on the number of one or more sidelink channels allowed to be sent in the time slot m-$k_i$.

In another possible implementation, the processing module is further configured to determine, if the number of one or more PSSCHs allowed to be sent in the time slot m-$k_i$ is one, that the number of bits of the sidelink HARQ-ACK information generated in correspondence to each time slot of the resource pool is one; and determine, if the number of one or more sidelink channels allowed to be sent in the time slot m-$k_i$ is greater than one, that the number of bits of the sidelink HARQ-ACK information generated in correspondence to each time slot of the resource pool is at most P, P being a number of the sidelink channels accommodable in one time slot at a minimum resource granularity in time domain configured by the higher layer signaling to send the sidelink channels in configuring the resource pool.

In another possible implementation, the processing module is further configured to determine, if different frequency-domain units of the time slot m-$k_i$ allow a plurality of sidelink channels to be transmitted, that the number of bits of the sidelink HARQ-ACK information generated in correspondence to each time slot of the resource pool is at most P*Q, P is a number of the sidelink channels accommodable in one time slot at a minimum resource granularity in time domain configured by the higher layer signaling to send the sidelink channels in configuring the resource pool, and Q is a number of pre-configured frequency-domain units divided in the resource pool based on a use of a minimum frequency-domain resource.

In another possible implementation, the number of bits of the sidelink HARQ-ACK information corresponding to each time slot of the resource pool includes:
  one; or
  at most P, P being a number of the sidelink channels accommodable in one time slot at a minimum resource granularity in time domain configured by the higher layer signaling to send the sidelink channels in configuring the resource pool; or
  at most P*Q, Q being a number of pre-configured frequency-domain units divided in the resource pool based on a use of a minimum frequency-domain resource.

In another possible implementation, the processing module is further configured to generate, by the first terminal, the sidelink HARQ-ACK codebook based on a monitoring time of a physical downlink control channel (PDCCH) and a length of a control resource set (CORESET) where the monitoring time is located.

In another possible implementation, the apparatus further comprises a receiving module.

The receiving module is configured to receive a second time-interval set configured by an access network device for the first terminal, the second time-interval set including a set of a time when the first terminal receives scheduling sidelink downlink control information (DCI) and slot offsets $k_i$ with which the sidelink HARQ-ACK codebook is fed back, both i and $k_i$ being positive integers.

The processing module is further configured to traverse a plurality of slot offsets $k_i$ in the second time-interval set, and generate, for each of time slots m-$k_i$, the sidelink HARQ-ACK codebook based on a start symbol for the monitoring time of the PDCCH scrambled by a sidelink RNTI and the length of the CORESET where the monitoring time is located.

In another possible implementation, the processing module is further configured to determine, if a number of one or more PDCCHs scrambled by the sidelink RNTI that are allowed to be sent in the time slot m-$k_i$ is one, that the number of bits of the sidelink HARQ-ACK information generated in correspondence to each time slot is one; and determine, if a number of one or more PDCCHs scrambled by the sidelink RNTI that are allowed to be sent in the time slot m-$k_i$ is greater than one, that the number of bits of the sidelink HARQ-ACK information generated in correspondence to each time slot is at most K, K being the number of the PDCCHs scrambled by the sidelink RNTI and configured by higher layer signaling.

In another possible implementation, the processing module is further configured to combine the uplink HARQ-ACK codebook and the sidelink HARQ-ACK codebook in a predetermined order to obtain the target HARQ-ACK feedback codebook.

The codebook types corresponding to the uplink HARQ-ACK codebook and the sidelink HARQ-ACK codebook are both semi-static HARQ-ACK codebooks.

In a possible implementation, the predetermined order includes:
an order that the sidelink HARQ-ACK codebook is sorted before the uplink HARQ-ACK codebook; or
an order that the uplink HARQ-ACK codebook is sorted before the sidelink HARQ-ACK codebook.

It should be noted that the apparatuses provided in the above embodiments, when implementing their functions, are illustrated only by the division of the functional modules described above. In practice, the functions described above can be assigned to different functional modules for implementation as actually needed, that is, the structure of the apparatus can be divided into different functional modules to perform all or part of the functions described above.

How the respective modules in the apparatuses provided by the embodiments described above operate has been descried in detail in the method embodiments, and is not described in detail here.

Figure 14:
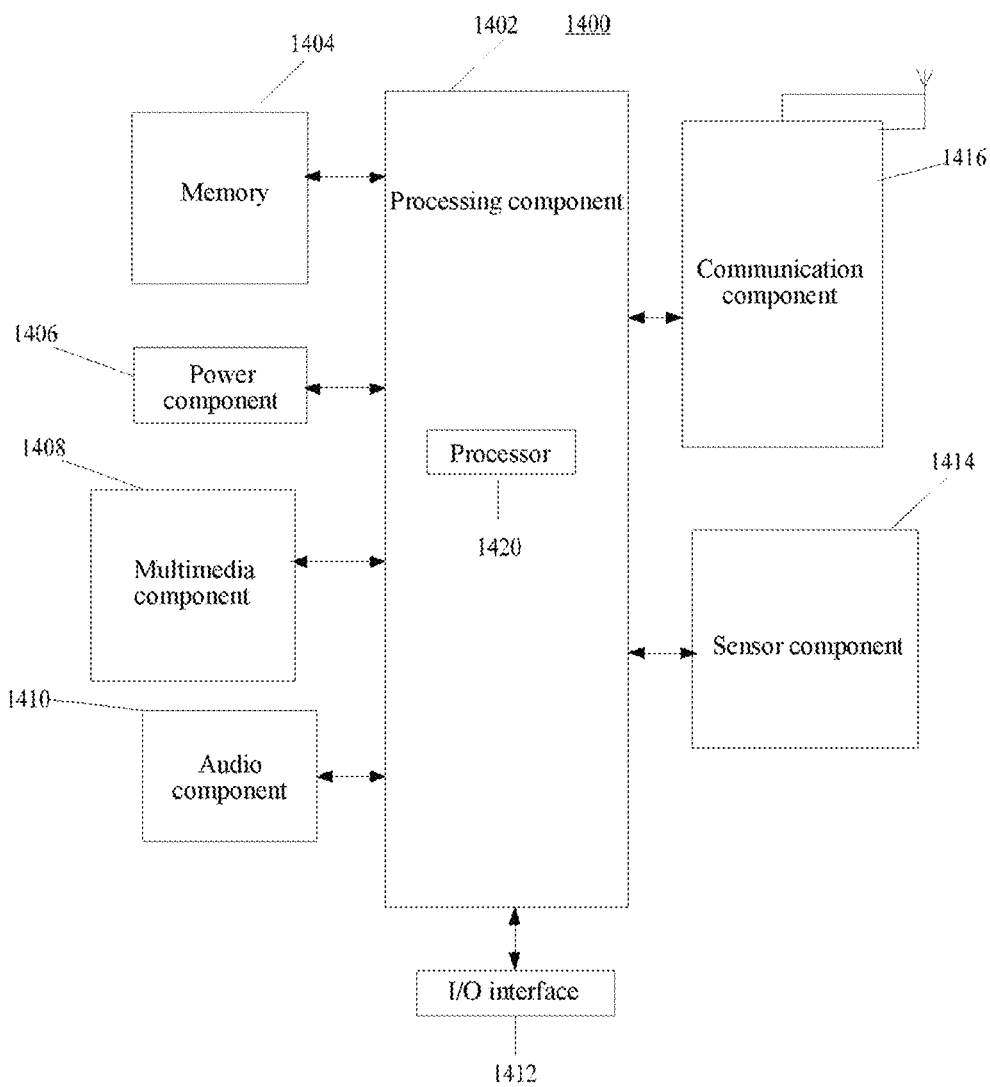
FIG. 14 is a block diagram showing a terminal according to an exemplary embodiment.

FIG. 14 is a block diagram showing a terminal 1400 according to an exemplary embodiment. For example, the terminal 1400 may be a mobile phone, a computer, a digital broadcasting terminal, a messaging device, a game console, a tablet device, medical equipment, fitness equipment, and a personal digital assistant, and the like.

Referring to FIG. 14, the terminal 1400 may include one or more components of: a processing component 1402, a memory 1404, a power component 1406, a multimedia component 1408, an audio component 1410, an input/output (I/O) interface 1412, a sensor component 1414, and a communication component 1416.

Processing component 1402 is configured usually to control overall operations of the terminal 1400, such as the operations associated with display, telephone calls, data communications, camera operations, and recording operations. Processing component 1402 can include one or more processors 1420 configured to execute instructions to perform all or part of the steps included in the methods described above. In addition, processing component 1402 may include one or more modules configured to facilitate the interaction between the processing component 1402 and other components. For example, processing component 1402 may include a multimedia module configured to facilitate the interaction between multimedia component 1408 and processing component 1402.

Memory 1404 is configured to store various types of data to support the operation of the terminal 1400. Examples of such data include instructions for any applications or methods operated on or performed by the terminal 1400, contact data, phonebook data, messages, pictures, video, etc. Memory 1404 may be implemented using any type of volatile or non-transitory memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Power component 1406 is configured to provide power to various components of the terminal 1400. Power component 1406 may include a power management system, one or more power sources, and any other components associated with the generation, management, and distribution of power in the terminal 1400.

Multimedia component 1408 includes a screen providing an output interface between the terminal 1400 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors configured to sense touches, swipes, and gestures on the touch panel. The touch sensors may sense not only a boundary of a touch or swipe operation, but also a period of time and a pressure associated with the touch or swipe operation. In some embodiments, multimedia component 1408 may include a front camera and/or a rear camera. The front camera and the rear camera may receive an external multimedia datum while the terminal 1400 is in an operation mode, such as a photographing mode or a video mode. Each of the front camera and the rear camera may be a fixed optical lens system or may have focus and/or optical zoom capabilities.

Audio component 1410 is configured to output and/or input audio signals. For example, audio component 1410 may include a microphone (MIC) configured to receive an external audio signal when the terminal 1400 is in an operation mode, such as a call mode, a recording mode, and a voice recognition mode. The received audio signal may be further stored in memory 1404 or transmitted via communication component 1416. In some embodiments, audio component 1410 further includes a speaker configured to output audio signals.

I/O interface 1412 is configured to provide an interface between processing component 1402 and peripheral interface modules, such as a keyboard, a click wheel, buttons, and the like. The buttons may include, but are not limited to, a home button, a volume button, a starting button, and a locking button.

Sensor component 1414 may include one or more sensors configured to provide status assessments of various aspects of the terminal 1400. For example, sensor component 1414 may detect an open/closed status of the terminal 1400, relative positioning of components which are, e.g., the display and the keypad of the terminal 1400, a change in position of the terminal 1400 or a component of the terminal 1400, a presence or absence of user contact with the terminal 1400, an orientation or an acceleration/deceleration of the terminal 1400, and a change in temperature of the terminal 1400. Sensor component 1414 may include a proximity sensor configured to detect the presence of nearby objects without any physical contact. Sensor component 1414 may also include a light sensor, such as a CMOS or CCD image sensor, for use in imaging applications. In some embodiments, sensor component 1414 may also include an accelerometer sensor, a gyroscope sensor, a magnetic sensor, a pressure sensor, or a temperature sensor.

Communication component 1416 is configured to facilitate wired or wireless communication between the terminal 1400 and other devices. The terminal 1400 can access a wireless network based on a communication standard, such as WiFi, 2G, or 3G, or a combination thereof. In an exemplary embodiment, communication component 1416 receives a broadcast signal or broadcast associated information from an external broadcast management system via a broadcast channel. In an exemplary embodiment, communication component 1416 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or any other suitable technologies.

In an exemplary embodiment, the terminal 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In an exemplary embodiment, there is also provided a non-transitory computer readable storage medium such as memory 1404 storing instructions executable by processor 1420 of the terminal 1400, for performing the methods described above.

The present disclosure may be a system, a method, and/or a computer program product. The computer program product may include a computer readable storage medium having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry such as programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowcharts and/or block diagrams of methods, apparatus (systems), and computer program products according to embodiments of the present disclosure. It can be appreciated that each block of the flowcharts and/or block diagrams, and combinations of blocks in the flowcharts and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/operations specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/operations specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/operations specified in the flowchart and/or block diagram block or blocks.

The flowcharts and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of instruction, comprising one or more executable instructions for implementing the specified logical function(s). In some alternative implementations, the functions marked in the block may occur in an order different from that marked in the drawings. For example, two blocks shown in succession may, in fact, be executed substantially concurrently, or the blocks may sometimes be executed in the reverse order, depending upon the functionality involved. It is also to be noted that each block of the block diagrams and/or flowcharts, and combinations of blocks in the block diagrams and/or flowcharts, can be implemented by special purpose hardware-based systems that perform the specified functions or operations, or combinations of special purpose hardware and computer instructions.

Various embodiments of the present disclosure have been described above. The above description is exemplary, not exhaustive. The present disclosure is not limited to those embodiments. Modifications and variations without departing from the scope and spirit of the embodiments will be apparent to a person skilled in the art. The terms used herein are intended to provide the best explanations on the principles of the embodiments, practical applications, or technical improvements to the technologies in the market, or to make the embodiments described herein understandable to other persons skilled in the art.

According to one aspect of the present disclosure, there is provided a feedback information transmission method, comprising:

sending, by a first terminal, a sidelink hybrid auto repeat request ACK (HARQ-ACK) codebook via a physical uplink channel within a target time unit for send sidelink HARQ-ACK information within the target time unit, the sidelink HARQ-ACK codebook including sidelink HARQ-ACK information corresponding to at least one sidelink data, wherein the sidelink HARQ-ACK information is configured to indicate a receiving state corresponding to the sidelink data, and the sidelink data is physical layer data sent by the first terminal via a sidelink.

In a possible implementation, said sending, by the first terminal, the sidelink HARQ-ACK codebook via the physical uplink channel within the target time unit comprises:

generating, by the first terminal, the sidelink HARQ-ACK codebook; and sending, by the first terminal, the sidelink HARQ-ACK codebook via a physical uplink control channel (PUCCH) or a physical uplink shared channel (PUSCH) within the target time unit.

In another possible implementation, sending, by a first terminal, a sidelink HARQ-ACK codebook via a physical uplink channel within a target time unit for send sidelink HARQ-ACK information within the target time unit comprises:

sending, by the first terminal, a target HARQ-ACK feedback codebook via the physical uplink channel within the target time unit for sending uplink HARQ-ACK information and the sidelink HARQ-ACK information within the target time unit, the target HARQ-ACK feedback codebook including an uplink HARQ-ACK codebook and the sidelink HARQ-ACK codebook, wherein the uplink HARQ-ACK codebook comprises uplink HARQ-ACK information corresponding to at least one downlink data.

In another possible implementation, before sending, by the first terminal, the target HARQ-ACK feedback codebook via the physical uplink channel within the target time unit, the method further comprises:

generating, by the first terminal, the uplink HARQ-ACK codebook;

generating, by the first terminal, the sidelink HARQ-ACK codebook; and combining, by the first terminal, the uplink HARQ-ACK codebook and the sidelink HARQ-ACK codebook to obtain the target HARQ-ACK feedback codebook.

In another possible implementation, said generating, by the first terminal, the sidelink HARQ-ACK codebook comprises:

generating, by the first terminal, the sidelink HARQ-ACK codebook based on a time domain position of a resource pool of a sidelink channel, wherein the sidelink channel includes a physical sidelink shared channel (PSSCH) or a physical sidelink feedback channel (PSFCH).

In another possible implementation, said generating, by the first terminal, the sidelink HARQ-ACK codebook based on the time domain position of the resource pool of the sidelink channel comprises:

traversing a plurality of resource pools of the first terminal, and generating, for each of the resource pools, sidelink HARQ-ACK information corresponding to the resource pool based on the time domain position of the sidelink channel in the resource pool; and sorting sidelink HARQ-ACK information respectively corresponding to the plurality of the resource pools in an ascending order of indexes of the resource pools, to obtain the sidelink HARQ-ACK codebook.

In another possible implementation, the target time unit is a time slot m, with m being a positive integer, the method further comprises:

receiving a first time-interval set configured by an access network device via higher layer signaling, wherein the first time-interval set includes a set of a time slot where an end symbol of the sidelink channel is located and slot offsets $k_i$ with which the sidelink HARQ-ACK codebook is fed back, both i and $k_i$ being positive integers;

traversing a plurality of slot offsets $k_i$ in the first time-interval set, and determining, for each time slot $m-k_i$, a number of one or more sidelink channels allowed to be sent in the time slot $m-k_i$; and for each of the plurality of resource pools of the first terminal, based on the number of one or more sidelink channels allowed to be sent in the time slot $m-k_i$, determining a number of bits of sidelink HARQ-ACK information generated in correspondence to each time slot of the resource pool.

In another possible implementation, the method further comprises:

determining whether the time slot $m-k_i$ is a possible time domain position for the sidelink channel, based on time domain resource information of the sidelink channel in the resource pool; and in response to the time slot $m-k_i$ being determined to be the possible time domain position for the sidelink channel, performing a determination on the number of bits of the sidelink HARQ-ACK information generated in correspondence to each time slot of the resource pool, based on the number of one or more sidelink channels allowed to be sent in the time slot $m-k_i$.

In another possible implementation, said determining the number of bits of the sidelink HARQ-ACK information generated in correspondence to each time slot of the resource pool, based on the number of one or more sidelink channels allowed to be sent in the time slot $m-k_i$ comprises:

in response to the number of one or more sidelink channels allowed to be sent in the time slot $m-k_i$ being one, determining that the number of bits of the sidelink HARQ-ACK information generated in correspondence to each time slot of the resource pool is one; and in response to the number of one or more sidelink channels allowed to be sent in the time slot $m-k_i$ being greater than one, determining that the number of bits of the sidelink HARQ-ACK information generated in correspondence to each time slot of the resource pool is at most P, wherein P is a number of sidelink channels accommodable in one time slot at a minimum resource granularity in time domain configured by the higher layer signaling to send the sidelink channels in configuring the resource pool.

In another possible implementation, said determining the number of bits of the sidelink HARQ-ACK information generated in correspondence to each time slot of the resource pool, based on the number of one or more sidelink channels allowed to be sent in the time slot m-$k_i$ comprises:
  in response to different frequency-domain units of the time slot m-$k_i$ allowing a plurality of sidelink channels to be sent, determining that the number of bits of the sidelink HARQ-ACK information generated in correspondence to each time slot of the resource pool is at most P*Q,
  wherein P is a number of sidelink channels accommodable in one time slot at a minimum resource granularity in time domain configured by the higher layer signaling to send the sidelink channels in configuring the resource pool, and Q is a number of pre-configured frequency-domain units divided in the resource pool based on a use of a minimum frequency-domain resource.

In another possible implementation, the number of bits of the sidelink HARQ-ACK information corresponding to each time slot of the resource pool includes:
  one; or
  at most P, wherein P is a number of sidelink channels accommodable in one time slot at a minimum resource granularity in time domain configured by the higher layer signaling to send the sidelink channels in configuring the resource pool; or
  at most P*Q, where Q is a number of pre-configured frequency-domain units divided in the resource pool based on a use of a minimum frequency-domain resource.

In a possible implementation, said generating, by the first terminal, the sidelink HARQ-ACK codebook comprises:
  generating, by the first terminal, the sidelink HARQ-ACK codebook based on a monitoring time of a physical downlink control channel (PDCCH) and a length of a control resource set (CORESET) where the monitoring time is located.

In a possible implementation, said generating, by the first terminal, the sidelink HARQ-ACK codebook based on the monitoring time of the physical downlink control channel (PDCCH) and the length of the control resource set (CORESET) where the monitoring time is located comprises:
  receiving a second time-interval set configured by an access network device for the first terminal, wherein the second time-interval set includes a set of a time at which the first terminal receives scheduling sidelink downlink control information (DCI) and slot offsets $k_i$ with which the sidelink HARQ-ACK codebook is fed back, both i and $k_i$ being positive integers; and traversing a plurality of slot offsets $k_i$ in the second time-interval set, and for each of time slots m-$k_i$, generating the sidelink HARQ-ACK codebook based on a start symbol for the monitoring time of the PDCCH scrambled by a sidelink radio network temporary identity (RNTI) and the length of the CORESET where the monitoring time is located.

In a possible implementation, the method further comprises:
  in response to a number of one or more PDCCHs scrambled by the sidelink RNTI that are allowed to be sent in the time slot m-$k_i$ being one, determining that a number of bits of the sidelink HARQ-ACK information generated in correspondence to each time slot is one; and
  in response to a number of one or more PDCCHs scrambled by the sidelink RNTI that are allowed to be sent in the time slot m-$k_i$ being greater than one, determining that the number of the bits of the sidelink HARQ-ACK information generated in correspondence to each time slot is at most K, K being the number of the PDCCHs scrambled by the sidelink RNTI that are configured by higher layer signaling.

In a possible implementation, said combining, by the first terminal, the uplink HARQ-ACK codebook and the sidelink HARQ-ACK codebook to obtain the target HARQ-ACK feedback codebook comprises:
  combining, by the first terminal, the uplink HARQ-ACK codebook and the sidelink HARQ-ACK codebook in a predetermined order to obtain the target HARQ-ACK feedback codebook,
  wherein a codebook type corresponding to the uplink HARQ-ACK codebook and a codebook type corresponding to the sidelink HARQ-ACK codebook are both semi-static HARQ-ACK codebooks.

In a possible implementation, the predetermined order includes:
  an order that the sidelink HARQ-ACK codebook is sorted before the uplink HARQ-ACK codebook; or
  an order that the uplink HARQ-ACK codebook is sorted before the sidelink HARQ-ACK codebook.

According to another aspect of the present disclosure, there is provided a feedback information transmission apparatus, comprising:
  a transmission module configured to send, by a first terminal, a sidelink HARQ-ACK codebook via a physical uplink channel within a target time unit for sending sidelink hybrid auto repeat request ACK (HARQ-ACK) information within the target time unit, wherein the sidelink HARQ-ACK codebook includes sidelink HARQ-ACK information corresponding to at least one sidelink data,
  wherein the sidelink HARQ-ACK information is configured to indicate a receiving state corresponding to the sidelink data, and the sidelink data is physical layer data sent by the first terminal via a sidelink.

In a possible implementation, the transmission module is further configured to generate the sidelink HARQ-ACK codebook; and send the sidelink HARQ-ACK codebook via a physical uplink control channel (PUCCH) or a physical uplink shared channel (PUSCH) within the target time unit.

In another possible implementation, the transmission module is further configured to send a target HARQ-ACK feedback codebook via a physical uplink channel within the target time unit for sending uplink HARQ-ACK information and the sidelink HARQ-ACK information within the target time unit, the target HARQ-ACK feedback codebook including an uplink HARQ-ACK codebook and the sidelink HARQ-ACK codebook,
  wherein the uplink HARQ-ACK codebook comprises uplink HARQ-ACK information corresponding to at least one downlink data.

In another possible implementation, the apparatus further comprises a processing module configured to generate the uplink HARQ-ACK codebook; generate the sidelink HARQ-ACK codebook; and combine the uplink HARQ-ACK codebook and the sidelink HARQ-ACK codebook to obtain the target HARQ-ACK feedback codebook.

In another possible implementation, the processing module is further configured to generate the sidelink HARQ-ACK codebook based on a time domain position of a resource pool of a sidelink channel, wherein the sidelink channel includes a PSSCH or a PSFCH.

In another possible implementation, the processing module is further configured to traverse a plurality of resource pools of the first terminal, and generate, for each of the resource pools, sidelink HARQ-ACK information corresponding to the resource pool based on a time domain position of the sidelink channel in the resource pool; and
    sort sidelink HARQ-ACK information respectively corresponding to the plurality of the resource pools in an ascending order of indexes of the resource pools, to obtain the sidelink HARQ-ACK codebook.

In another possible implementation, the target time unit is a time slot m, with m being a positive integer, the apparatus further comprises a receiving module,
    wherein the receiving module is configured to receive a first time-interval set that is configured by an access network device via higher layer signaling, the first time-interval set including a set of a time slot where an end symbol of the sidelink channel is located and slot offsets $k_i$ with which the sidelink HARQ-ACK codebook is fed back, both i and $k_i$ being positive integers; and
    the processing module is further configured to traverse a plurality of slot offsets $k_i$ in the first time-interval set, and determine, for each time slot m-$k_i$, a number of one or more PSSCHs allowed to be sent in the time slot m-$k_i$; and for each of the plurality of resource pools of the first terminal, based on the number of one or more sidelink channels allowed to be sent in the time slot m-$k_i$, determine a number of bits of sidelink HARQ-ACK information generated in correspondence to each time slot of the resource pool.

In another possible implementation, the processing module is further configured to determine whether the time slot m-$k_i$ is a possible time domain position for the sidelink channel, based on time domain resource information of the sidelink channel in the resource pool; and in response to the time slot m-$k_i$ being determined to be the possible time domain position for the sidelink channel, performing a determination on the number of bits of the sidelink HARQ-ACK information generated in correspondence to each time slot of the resource pool, based on the number of one or more sidelink channels allowed to be sent in the time slot m-$k_i$.

In another possible implementation, the processing module is further configured to determine, in response to the number of one or more sidelink channels allowed to be sent in the time slot m-$k_i$ being one, that the number of bits of the sidelink HARQ-ACK information generated in correspondence to each time slot of the resource pool is one; and
    determine, in response to the number of one or more sidelink channels allowed to be sent in the time slot m-$k_i$ being greater than one, that the number of bits of the sidelink HARQ-ACK information generated in correspondence to each time slot of the resource pool is at most P, P being a number of sidelink channels accommodable in one time slot at a minimum resource granularity in time domain configured by the higher layer signaling to send the sidelink channels in configuring the resource pool.

In another possible implementation, the processing module is further configured to determine, in response to different frequency-domain units of the time slot m-$k_i$ allowing a plurality of sidelink channels to be transmitted, that the number of bits of the sidelink HARQ-ACK information generated in correspondence to each time slot of the resource pool is at most P*Q,
    wherein P is a number of sidelink channels accommodable in one time slot at a minimum resource granularity in time domain configured by the higher layer signaling to send the sidelink channels in configuring the resource pool, and Q is a number of pre-configured frequency-domain units divided in the resource pool based on a use of a minimum frequency-domain resource.

In another possible implementation, the number of bits of the sidelink HARQ-ACK information corresponding to each time slot of the resource pool includes:
    one; or
    at most P, P being a number of the sidelink channels accommodable in one time slot at a minimum resource granularity in time domain configured by the higher layer signaling to send the sidelink channels in configuring the resource pool; or
    at most P*Q, Q being a number of pre-configured frequency-domain units divided in the resource pool based on a use of a minimum frequency-domain resource.

In another possible implementation, the processing module is further configured to generate the sidelink HARQ-ACK codebook based on a monitoring time of a physical downlink control channel (PDCCH) and a length of a control resource set (CORESET) where the monitoring time is located.

In another possible implementation, the apparatus further comprises a receiving module,
    wherein the receiving module is configured to receive a second time-interval set configured by an access network device for the first terminal, the second time-interval set includes a set of a time at which the first terminal receives scheduling sidelink downlink control information (DCI) and slot offsets $k_i$ with which the sidelink HARQ-ACK codebook is fed back, both i and $k_i$ being positive integers; and
    the processing module is further configured to traverse a plurality of slot offsets $k_i$ in the second time-interval set, and for each of time slots m-$k_i$, generating the sidelink HARQ-ACK codebook based on a start symbol for the monitoring time of the PDCCH scrambled by a sidelink RNTI and the length of the CORESET where the monitoring time is located.

In another possible implementation, the processing module is further configured to determine, in response to a number of one or more PDCCHs scrambled by the sidelink RNTI that are allowed to be sent in the time slot m-$k_i$ being one, that the number of bits of the sidelink HARQ-ACK information generated in correspondence to each time slot is one; and
    determine, in response to a number of one or more PDCCHs scrambled by the sidelink RNTI that are allowed to be sent in the time slot m-$k_i$ being greater than one, that the number of the bits of the sidelink HARQ-ACK information generated in correspondence to each time slot is at most K, K being the number of the PDCCHs scrambled by the sidelink RNTI that are configured by higher layer signaling.

In another possible implementation, the processing module is further configured to combine the uplink HARQ-ACK codebook and the sidelink HARQ-ACK codebook in a predetermined order to obtain the target HARQ-ACK feedback codebook, wherein a codebook type corresponding to the uplink HARQ-ACK codebook and a codebook type corresponding to the sidelink HARQ-ACK codebook are both semi-static HARQ-ACK codebooks.

In another possible implementation, the predetermined order includes:
an order that the sidelink HARQ-ACK codebook is sorted before the uplink HARQ-ACK codebook; or
an order that the uplink HARQ-ACK codebook is sorted before the sidelink HARQ-ACK codebook.

According to another aspect of the present disclosure, there is provided a terminal, comprising:
a processor; and
a memory configured to store instructions executable by the processor,
wherein the processor is configured to:
send a sidelink HARQ-ACK codebook via a physical uplink channel within the target time unit for sending sidelink hybrid auto repeat request ACK (HARQ-ACK) information within a target time unit, the sidelink HARQ-ACK codebook including sidelink HARQ-ACK information corresponding to at least one piece of sidelink data,
wherein the sidelink HARQ-ACK information is configured to indicate a receiving state corresponding to the sidelink data, and the sidelink data is physical layer data sent by the first terminal via a sidelink.

According to another aspect of the present disclosure, there is provided a non-transitory computer-readable storage medium having computer program instructions stored thereon, wherein the computer program instructions, when executed by a processor, implement the method described above.

In the embodiments of the present disclosure, in a case where sidelink HARQ-ACK information needs to be sent within a target time unit, a first terminal sends a sidelink HARQ-ACK codebook via a physical uplink channel within the target time unit. Thus, the first terminal can support data transmission when the sidelink HARQ-ACK information needs to be sent within the target time unit, thereby avoiding the situation in the related art that the first terminal cannot associate a sidelink resource, when included in the DCI, with the PDSCH SLIV, and ensuring a success rate of feeding back a sidelink HARQ-ACK codebook in a sidelink communication scenario.

What is claimed is:

1. A feedback information transmission method, comprising:
generating, by a first terminal, a sidelink hybrid auto repeat request ACK (HARQ-ACK codebook based on a time domain position of a resource pool of a sidelink channel and a first time-interval set, wherein the sidelink channel includes a physical sidelink shared channel PSSCH) and a physical sidelink feedback channel (PSFCH); and
sending, by a first terminal, the sidelink HARQ-ACK codebook via a physical uplink control channel (PUCCH) or a physical uplink shared channel (PUSCH) within a target time unit for sending sidelink HARQ-ACK information corresponding to at least one sidelink data, wherein the sidelink HARQ-ACK codebook includes the sidelink HARQ-ACK information,
wherein the sidelink HARQ-ACK information is configured to indicate a receiving state corresponding to the sidelink data, and the sidelink data is physical layer data sent by the first terminal via a sidelink, and
wherein the method further comprises:
receiving the first time-interval set configured via higher layer signaling, wherein the first time-interval set includes a set of offsets $k_i$ between a first time slot where an end symbol of the sidelink channel is located and a second time slot where the sidelink HARQ-ACK codebook is fed back, both i and $k_i$ being positive integers.

2. The method according to claim 1, further comprising:
sending, by the first terminal, a target HARQ-ACK feedback codebook via the PUCCH or the PUSCH within the target time unit for sending the uplink HARQ-ACK information in addition to the sending of the sidelink HARQ-ACK information within the target time unit for sending the sidelink HARQ-ACK information, wherein the target HARQ-ACK feedback codebook includes an uplink HARQ-ACK codebook and the sidelink HARQ-ACK codebook,
wherein the uplink HARQ-ACK codebook comprises uplink HARQ-ACK information corresponding to at least one downlink data.

3. The method according to claim 2, wherein before sending, by the first terminal, the target HARQ-ACK feedback codebook via the PUCCH or the PUSCH within the target time unit for sending the uplink HARQ-ACK information, the method further comprises:
generating, by the first terminal, the uplink HARQ-ACK codebook;
the generating of, by the first terminal, the sidelink HARQ-ACK codebook; and
combining, by the first terminal, the uplink HARQ-ACK codebook and the sidelink HARQ-ACK codebook to obtain the target HARQ-ACK feedback codebook.

4. The method according to claim 3, wherein said combining, by the first terminal, the uplink HARQ-ACK codebook and the sidelink HARQ-ACK codebook to obtain the target HARQ-ACK feedback codebook comprises:
combining, by the first terminal, the uplink HARQ-ACK codebook and the sidelink HARQ-ACK codebook in a predetermined order to obtain the target HARQ-ACK feedback codebook,
wherein a codebook type corresponding to the uplink HARQ-ACK codebook and a codebook type corresponding to the sidelink HARQ-ACK codebook are both semi-static HARQ-ACK.

5. The method according to claim 4, wherein the predetermined order includes:
an order that the sidelink HARQ-ACK codebook is sorted before the uplink HARQ-ACK codebook; or
an order that the uplink HARQ-ACK codebook is sorted before the sidelink HARQ-ACK codebook.

6. The method according to claim 1, wherein said generating, by the first terminal, the sidelink HARQ-ACK codebook based on the time domain position of the resource pool of the sidelink channel comprises:
traversing a plurality of resource pools of the first terminal, and generating, for each of the resource pools, sidelink HARQ-ACK information corresponding to the resource pool based on the time domain position of the sidelink channel in the resource pool; and
sorting sidelink HARQ-ACK information respectively corresponding to the plurality of the resource pools in an ascending order of indexes of the resource pools, to obtain the sidelink HARQ-ACK codebook.

7. The method according to claim 1, wherein the method further comprises:

traversing the set of offsets $k_i$ in the first time-interval set, and determining, for the first time slot, a number of the PSSCHs that are allowed to be sent in the first time slot; and for each of a plurality of resource pools of the first terminal, based on the number of the PSSCHs that are allowed to be sent in the first time slot determining a number of bits of sidelink HARQ-ACK information generated in correspondence to each of a plurality of time slots of the resource pool.

8. The method according to claim 7, wherein the method further comprises:

determining whether the first time slot is a possible time domain position for the sidelink channel, based on time domain resource information of the sidelink channel in the resource pool; and in response to the first time slot being determined to be the possible time domain position for the sidelink channel, performing a determination on the number of bits of the sidelink HARQ-ACK information generated in correspondence to each of the plurality of time slots of the resource pool based on the number of the PSSCHs that are allowed to be sent in the first time slot.

9. The method according to claim 7, wherein said determining the number of bits of the sidelink HARQ-ACK information generated in correspondence to each of the plurality of time slots of the resource pool based on the number of the PSSCHs that are allowed to be sent in the first time slot comprises:

in response to the number of the PSSCHs that are allowed to be sent in the first time slot being one, determining that the number of bits of the sidelink HARQ-ACK information generated in correspondence to each of the plurality of time slots of the resource pool is one; and in response to the number the PSSCHs that are allowed to be sent in the first time slot being greater than one, determining that the number of bits of the sidelink HARQ-ACK information generated in correspondence to each of the plurality of time slots of the resource pool is at most P, wherein P is a number of sidelink channels accommodable in one time slot at a minimum resource granularity in time domain configured by the higher layer signaling to send the sidelink channels in configuring the resource pool.

10. The method according to claim 7, wherein said determining the number of bits of the sidelink HARQ-ACK information generated in correspondence to each of the plurality of time slots of the resource pool based on the number of the PSSCHs that are allowed to be sent in the first time slot comprises:

in response to different frequency-domain units of the first time slot allowing a plurality of sidelink channels to be sent, determining that the number of bits of the sidelink HARQ-ACK information generated in correspondence to each of the plurality of time slots of the resource pool is at most P*Q, wherein P is a number of sidelink channels accommodable in one time slot at a minimum resource granularity in time domain configured by the higher layer signaling to send the sidelink channels in configuring the resource pool, and Q is a number of pre-configured frequency-domain units divided in the resource pool based on a use of a minimum frequency-domain resource.

11. The method according to claim 7, wherein the number of bits of the sidelink HARQ-ACK information corresponding to each of the plurality of time slots of the resource pool includes:

one;

at most P, wherein P is a number of sidelink channels accommodable in one time slot at a minimum resource granularity in time domain configured by the higher layer signaling to send the sidelink channels in configuring the resource pool; or at most P*Q, wherein Q is a number of pre-configured frequency-domain units divided in the resource pool based on a use of a minimum frequency-domain resource.

12. A terminal, comprising:

a processor; and a memory configured to store instructions executable by the processor, wherein the processor is configured to:

generate a sidelink hybrid auto repeat request ACK (HARQ-ACK) codebook based on a time domain position of a resource pool of a sidelink channel and a first time-interval set, wherein the sidelink channel includes a physical sidelink shared channel (PSSCH) and a physical sidelink feedback channel (PSFCH); and send the sidelink HARQ-ACK codebook via a physical uplink control channel (PUCCH) or a physical uplink shared channel (PUSCH) within a target time unit for sending sidelink HARQ-ACK information corresponding to at least one sidelink data, wherein the sidelink HARQ-ACK codebook includes the sidelink HARQ-ACK information, wherein the sidelink HARQ-ACK information is configured to indicate a receiving state corresponding to the sidelink data, and the sidelink data is physical layer data sent by the terminal via a sidelink, and wherein the method further comprises:

receiving the first time-interval set configured via higher layer signaling, wherein the first time-interval set includes a set of offsets $k_i$ between a first time slot where an end symbol of the sidelink channel is located and a second time slot where the sidelink HARQ-ACK codebook is fed back, both i and $k_i$ being positive integers.

13. The terminal according to claim 12, wherein the processor is further configured to:

send a target HARQ-ACK feedback codebook via the PUCCH or the PUSCH within the target time unit for sending the uplink HARQ-ACK information in addition to the sending of the sidelink HARQ-ACK information within the target time unit for sending the sidelink HARQ-ACK information, wherein the target HARQ-ACK feedback codebook includes an uplink HARQ-ACK codebook and the sidelink HARQ-ACK codebook, wherein the uplink HARQ-ACK codebook comprises uplink HARQ-ACK information corresponding to at least one downlink data.

14. The terminal according to claim 13, wherein before sending the target HARQ-ACK feedback codebook via the PUCCH or the PUSCH within the target time unit for sending the uplink HARQ-ACK information, the processor is further configured to:

generate the uplink HARQ-ACK codebook;

perform the generation of the sidelink HARQ-ACK codebook; and combine the uplink HARQ-ACK codebook and the sidelink HARQ-ACK codebook to obtain the target HARQ-ACK feedback codebook.

15. The terminal according to claim 12, wherein said generating the sidelink HARQ-ACK codebook based on the time domain position of the resource pool of the sidelink channel comprises, by the processor:
   traversing a plurality of resource pools of the terminal, and generating, for each of the resource pools, sidelink HARQ-ACK information corresponding to the resource pool based on the time domain position of the sidelink channel in the resource pool; and
   sorting sidelink HARQ-ACK information respectively corresponding to the plurality of the resource pools in an ascending order of indexes of the resource pools, to obtain the sidelink HARQ-ACK codebook.

16. A non-transitory computer-readable storage medium having computer program instructions stored thereon, wherein the computer program instructions, when executed by a processor of a terminal, cause the processor to:
   generate a sidelink hybrid auto repeat request ACK (HARQ-ACK) codebook based on a time domain position of a resource pool of a sidelink channel and a first time-interval set, wherein the sidelink channel includes a physical sidelink shared channel (PSSCH) and a physical sidelink feedback channel (PSFCH); and
   send the sidelink HARQ-ACK codebook via a physical uplink control channel (PUCCH) or a physical uplink shared channel (PUSCH) within a target time unit for sending sidelink HARQ-ACK information corresponding to at least one sidelink data, wherein the sidelink HARQ-ACK codebook includes the sidelink HARQ-ACK information,
   wherein the sidelink HARQ-ACK information is configured to indicate a receiving state corresponding to the sidelink data, and the sidelink data is physical layer data sent by the first terminal via a sidelink,
   wherein the method further comprises:
   receiving the first time-interval set configured via higher layer signaling, wherein the first time-interval set includes a set of offsets $k_i$ between a first time slot where an end symbol of the sidelink channel is located and a second time slot where the sidelink HARQ-ACK codebook is fed back, both i and $k_i$ being positive integers.

17. The non-transitory computer storage medium according to claim 16, wherein the processor is further caused to:
   send a target HARQ-ACK feedback codebook via the PUCCH or the PUSCH within the target time unit for sending the uplink HARQ-ACK information in addition to the sending of the sidelink HARQ-ACK information within the target time unit for sending the sidelink HARQ-ACK information, wherein the target HARQ-ACK feedback codebook includes an uplink HARQ-ACK codebook and the sidelink HARQ-ACK codebook,
   wherein the uplink HARQ-ACK codebook comprises uplink HARQ-ACK information corresponding to at least one downlink data.

18. The non-transitory computer storage medium according to claim 17, wherein before sending the target HARQ-ACK feedback codebook via the PUCCH or the PUSCH within the target time unit for sending the uplink HARQ-ACK information, the processor is further caused to:
   generate the uplink HARQ-ACK codebook;
   perform the generation of the sidelink HARQ-ACK codebook; and
   combine the uplink HARQ-ACK codebook and the sidelink HARQ-ACK codebook to obtain the target HARQ-ACK feedback codebook.

19. The non-transitory computer storage medium according to claim 16, wherein said generating the sidelink HARQ-ACK codebook based on the time domain position of the resource pool of the sidelink channel comprises, by the processor:
   traversing a plurality of resource pools of the terminal, and generating, for each of the resource pools, sidelink HARQ-ACK information corresponding to the resource pool based on the time domain position of the sidelink channel in the resource pool; and
   sorting sidelink HARQ-ACK information respectively corresponding to the plurality of the resource pools in an ascending order of indexes of the resource pools, to obtain the sidelink HARQ-ACK codebook.

20. The non-transitory computer storage medium according to claim 16, wherein the processor is further caused to:
   traverse the set of offsets $k_i$ in the first time-interval set, and determining, for the first time slot, a number of the PSSCHs that are allowed to be sent in the first time slot; and
   for each of a plurality of resource pools of the first terminal, based on the number of the PSSCHs that are allowed to be sent in the first time slot, determine a number of bits of sidelink HARQ-ACK information generated in correspondence to each of a plurality of time slots of the resource pool.

* * * * *